US012714899B1

(12) United States Patent
Kordlou

(10) Patent No.: US 12,714,899 B1
(45) Date of Patent: Aug. 25, 2026

(54) MULTI-MODAL COMBUSTION INTERRUPTION SYSTEM WITH ADAPTIVE ELECTROMAGNETIC EMISSION

(71) Applicant: Hossein Kordlou, Woodland Hills, CA (US)

(72) Inventor: Hossein Kordlou, Woodland Hills, CA (US)

( * ) Notice: Subject to any disclaimer, the term of this patent is extended or adjusted under 35 U.S.C. 154(b) by 0 days.

(21) Appl. No.: 19/540,833

(22) Filed: Feb. 16, 2026

(51) Int. Cl.
*A62C 37/36* (2006.01)
*A62C 99/00* (2010.01)

(52) U.S. Cl.
CPC ............ *A62C 37/04* (2013.01); *A62C 99/009* (2013.01)

(58) Field of Classification Search
CPC ....... A62C 37/38; A62C 37/40; A62C 3/0214; A62C 2/04; A62C 31/03; A62C 3/0278
See application file for complete search history.

(56) References Cited

U.S. PATENT DOCUMENTS 12,415,107 B1 * 9/2025 Byrd .................... A62C 3/0278
2003/0051886 A1 * 3/2003 Adiga ................ A62C 99/0072 169/43
2021/0370116 A1 * 12/2021 Nino .................. A62C 99/0009
2022/0143437 A1 * 5/2022 Wade .................. A62C 3/0271

* cited by examiner

*Primary Examiner* — Tuongminh N Pham

(57) ABSTRACT

A multi-modal combustion interruption system comprises a detection subsystem configured to identify combustion events, an electromagnetic emission subsystem having pulsed energy source and directional emission structure, a control processor implementing adaptive modulation based on measured combustion response, and a safety enforcement subsystem configured to control emission activation based on presence detection. The system may be configured in various modes from baseline electromagnetic emission through enhanced configurations incorporating optional ionization enhancement, particle generation, and acoustic energy subsystems. Adaptive modulation enables parameter selection based on measured combustion response rather than predetermined values. The modular architecture enables configuration selection based on deployment type and application requirements. Fixed installations may utilize grid power for industrial facility protection. Mobile platforms may employ onboard power for emergency response or wildfire intervention. Configuration selection may consider environmental compatibility including omission of particle generation for water-sensitive equipment environments or incorporation of multiple enhancement subsystems for demanding applications.

22 Claims, 6 Drawing Sheets

MULTI-MODAL COMBUSTION INTERRUPTION SYSTEM WITH ADAPTIVE ELECTROMAGNETIC EMISSION

FIELD

This disclosure relates generally to non-contact fire suppression and combustion control systems. More particularly, it relates to multi-modal systems that may combine electromagnetic emission with optional enhancement modalities including ionization generation, particle introduction, and acoustic energy to interrupt combustion processes.

BACKGROUND

Conventional Fire Suppression Technologies and Their Limitations

Conventional fire suppression technologies employ consumable agents including water, foam, halogenated compounds, or inert gases. While these approaches can be effective in many scenarios, they present significant limitations in certain critical applications. In environments containing sensitive electronic equipment such as data centers or telecommunications facilities, water introduction may cause equipment damage or short circuits potentially destroying millions of dollars worth of servers, network equipment, and stored data. In battery manufacturing facilities, certain chemical suppressants may react with lithium, cobalt, or other battery materials creating additional hazards or contaminating production environments requiring extensive cleanup. For wildfire prevention and control, conventional firebreak creation requires vegetation removal through bulldozing, controlled burning, or manual clearing, resulting in significant environmental impact including habitat destruction, soil erosion potential, and ecosystem disruption that may persist for years or decades.

Additionally, conventional suppression approaches require substantial logistical infrastructure. Water-based systems need pressurized water supplies, piping networks, pump systems, and storage tanks. Chemical and gas systems require agent storage in pressurized cylinders or tanks, distribution piping, discharge nozzles, and periodic agent replacement due to leakage or degradation. These systems have finite suppression capacity determined by stored agent quantity. Once agent is exhausted, system capability is lost until refilling or recharging occurs. For remote locations, wildland fires, or extended duration incidents, consumable agent logistics presents significant operational constraints limiting deployment effectiveness and increasing costs.

DARPA Instant Flame Suppression Program—Analysis of Technical Limitations

The Defense Advanced Research Projects Agency examined acoustic pressure wave techniques during the Instant Flame Suppression program conducted from approximately 2008 to 2011. Program documentation indicates that while acoustic energy could influence flame structure and in some laboratory conditions temporarily disrupt combustion processes, the approach was not pursued for operational deployment or transition to military or civilian fire suppression applications. Analysis of program results reveals five fundamental technical limitations that prevented practical deployment.

First Technical Limitation—Energy Dissipation with Distance: Program experimental results demonstrated that acoustic energy dissipates with distance according to inverse square law relationships and atmospheric absorption mechanisms. Laboratory demonstrations showing effectiveness at very close proximity did not translate to practical standoff distances required for real-world deployment scenarios. Program documentation indicates effective acoustic flame interaction range was limited to approximately two meters from the acoustic source, with rapidly diminishing effectiveness beyond this distance. This close proximity requirement eliminates safety margin and operational flexibility required for industrial deployment or emergency response scenarios. Firefighters, facility operators, or autonomous systems cannot safely or practically position acoustic sources within two meters of active fires. Heat flux from flames, smoke obscuration, structural obstacles, and personnel safety requirements demand meaningful standoff distances typically measured in meters or tens of meters depending on fire intensity and deployment scenario. Furthermore, acoustic intensity decreases rapidly with distance due to geometric spreading loss and atmospheric absorption particularly at higher frequencies employed for flame interaction. To maintain effective acoustic pressure levels at target combustion zones located at greater distances requires proportionally higher source acoustic power outputs. Power scaling relationships indicated that achieving effective acoustic suppression at industrial standoff distances would require impractically large acoustic source powers, transducer arrays, and associated electrical power supplies.

Second Technical Limitation—Static Frequency Selection Without Adaptation: The acoustic systems investigated in the DARPA program did not incorporate adaptive frequency modulation or real-time feedback mechanisms based on combustion state measurements. Acoustic source frequency, amplitude, pulse characteristics, and modulation patterns were predetermined based on fuel type, flame configuration, or other a priori assumptions about combustion conditions. Static frequency selection proved ineffective across varying fuel types having different combustion chemistry and flame dynamics, flame geometries ranging from pool fires to spray flames to diffusion flames, and environmental conditions including ambient temperature, humidity, air currents, and atmospheric pressure variations. No mechanism existed to measure combustion response to acoustic excitation and adjust acoustic parameters accordingly based on observed effectiveness. Effectiveness varied unpredictably with changing conditions. Different liquid fuels, gaseous fuels, and solid fuels exhibited different combustion characteristics and acoustic susceptibility. Flame sizes ranging from small laboratory burners to larger pool fires showed different acoustic interaction behaviors. Atmospheric conditions affected both flame characteristics and acoustic propagation. The static parameter approach could not accommodate this variability. Real-time adaptive optimization would require combustion state sensors measuring flame temperature distributions, spectroscopic emission signatures, displacement under acoustic forcing, or other observable parameters, plus control algorithms varying acoustic parameters systematically and identifying parameter values producing desired combustion modification. Such adaptive architectures were not developed in the program.

Third Technical Limitation—No Directional Beam-Forming: Laboratory demonstrations employed omnidirectional or wide-angle acoustic sources without beam-forming capability to concentrate acoustic energy toward specific target combustion zones. Acoustic transducers radiated acoustic energy broadly in many directions rather than focusing energy along a suppression axis toward flames. This omnidirectional distribution reduced effective acoustic intensity at target locations and increased power requirements for achieving given suppression effectiveness. Acoustic energy propagating in directions away from combustion zones provided no suppression benefit while consuming source power. For practical deployment, focusing acoustic energy toward flames would improve efficiency by concentrating available power where needed. Acoustic beam-forming techniques exist including horn-loaded drivers with directional radiation patterns, parametric acoustic arrays generating narrow beams through nonlinear frequency mixing, phased arrays with electronic beam steering through element phase control, and parabolic reflector configurations. However, such directional acoustic architectures were not investigated or demonstrated in the program. Additionally, omnidirectional radiation increases acoustic exposure in all directions potentially creating hearing damage risk for personnel, interfering with voice communications, triggering false alarms in acoustic detection systems, and generating noise pollution. Directional emission would reduce unwanted exposure while improving suppression effectiveness.

Fourth Technical Limitation—No Multi-Modal Enhancement Strategy: The DARPA Instant Flame Suppression program investigated acoustic pressure wave energy as a standalone suppression modality without exploring synergistic combination with other suppression mechanisms. No examination of multi-modal approaches combining acoustic energy with electromagnetic emission, ionization generation, particle introduction, or other complementary technologies that might provide enhanced suppression capability through different physical mechanisms operating together. Single-modality approaches face inherent limitations. Acoustic suppression relies solely on gas density perturbations and flame structure disruption. If acoustic interaction proves insufficient due to distance, flame intensity, fuel characteristics, or other factors, no alternative suppression mechanism is available. System effectiveness depends entirely on acoustic mechanism adequacy. Multi-modal architectures could combine different suppression mechanisms addressing different aspects of combustion processes. For example, electromagnetic emission might directly affect charged species populations and electric field distributions in flames, acoustic energy might modulate gas density and flow patterns, ionization enhancement might increase charge carrier concentrations, and particle introduction might provide oxygen displacement or heat absorption. These mechanisms operating synergistically might achieve suppression when individual mechanisms prove insufficient. Furthermore, modular multi-modal architectures enable configuration selection based on application requirements. Applications where certain modalities present concerns could employ alternative modality combinations, improving deployment viability across diverse scenarios.

Fifth Technical Limitation—No Safety Architecture for Human-Occupied Environments: Acoustic suppression systems investigated in the DARPA program were not configured with comprehensive safety enforcement suitable for deployment in human-occupied facilities including data centers, manufacturing plants, commercial buildings, healthcare facilities, or other spaces where personnel may be present during fire emergencies. Safety considerations for high-intensity acoustic systems include hearing damage potential from exposure to high sound pressure levels, interference with emergency communications and alarms, physiological effects beyond auditory impact at very high intensities, psychological stress from intense noise exposure particularly during emergency situations, and nuisance impacts on building occupants and neighbors. Deploying acoustic fire suppression in occupied spaces would require presence detection capability identifying when and where personnel are present, exclusion zone computation determining safe distances based on acoustic output levels and applicable exposure limits, emission control preventing acoustic activation when personnel detected within exclusion zones, hardware-level fail-safe interlocks ensuring safety function even during control system failures, warning signals and indicators alerting personnel before acoustic activation, and integration with building management and emergency response systems. Such comprehensive safety architectures were not developed or demonstrated in the DARPA program which focused on laboratory proof-of-concept rather than operational deployment readiness. The absence of safety enforcement prevented transition from research demonstration to practical application.

How the Present Disclosure Overcomes DARPA Limitations: The present disclosure addresses each identified DARPA limitation through specific technical innovations absent from the acoustic-only approach. Standoff capability is achieved through electromagnetic emission with directional beam-forming structures including horn antennas, parabolic reflectors, phased arrays, lens antennas, and electromagnetic metasurfaces providing focused electromagnetic energy delivery enabling practical standoff operation. Adaptive real-time optimization is provided through measuring combustion response via thermal imaging, ultraviolet detection, and visible light sensors, then varying emission parameters including pulse repetition frequency, pulse duration, duty cycle, and power level, finally selecting parameters producing desired combustion modification using optimization algorithms. Multi-modal synergistic architecture enables electromagnetic emission baseline operation with optional ionization, particle, and acoustic enhancements. Comprehensive safety enforcement incorporates presence detection through multiple sensor modalities, dynamic exclusion zone computation, and hardware-level fail-safe controls enabling deployment in human-occupied facilities.

AFRL Electromagnetic Suppression Research—Analysis of Deployment Barriers

The United States Air Force Research Laboratory demonstrated electromagnetic flame suppression capabilities in experimental programs conducted between approximately 1997 and 2000. Laboratory documentation describes successful extinguishment of various hydrocarbon flames including heptane pool fires, diesel pool fires, kerosene pool fires, and forced-flow propane and butane flames using pulsed electrical discharge between electrodes. The laboratory characterized this as a non-chemical suppression process eliminating consumable agent requirements. Despite laboratory success demonstrations, the electromagnetic suppression approach investigated by AFRL was not transitioned to operational military or civilian fire suppression systems. Analysis of program documentation reveals five specific technical barriers preventing deployment.

First Technical Limitation—Close Proximity Operation: The demonstrated AFRL electromagnetic suppression systems operated at very close proximity to flames, with documentation indicating electrode positioning typically less than one-half meter from combustion zones. In some configurations, flames occurred directly between discharge electrodes. This immediate proximity provided no safety margin or operational flexibility for practical deployment scenarios. Industrial fire suppression deployment requires meaningful standoff distances for multiple critical reasons. Personnel safety demands operator positioning at safe distances from heat flux, toxic combustion products, smoke obscuration, and potential explosion or deflagration hazards. Firefighters and facility operators cannot safely approach within half meter of active industrial fires. Equipment protection requires positioning suppression systems away from extreme thermal environments that could damage electronics, degrade materials, or compromise mechanical components. Operational accessibility demands practical placement and servicing without requiring crane access, confined space entry, or specialized positioning equipment. AFRL demonstrations did not address transition from laboratory-scale close-proximity demonstrations to industrial standoff distances. Electromagnetic field strength decreases with distance according to spreading loss and atmospheric absorption. Achieving sufficient electric field strength to affect combustion processes at industrial standoff requires substantially higher source power, larger antenna structures for directional gain, and sophisticated electromagnetic architectures beyond laboratory electrode gaps.

Second Technical Limitation—Unfocused Electromagnetic Discharge: AFRL electromagnetic suppression systems employed unfocused electromagnetic discharge between electrodes without directional beam-forming capability or focused energy delivery to target combustion zones. Electrical discharge occurred along paths of least resistance between electrode surfaces generating electromagnetic fields and plasma in discharge regions but not concentrating energy along specific suppression axes toward flames. This unfocused discharge architecture has multiple limitations for practical deployment. Electromagnetic energy distribution lacks directionality with fields present throughout inter-electrode volumes rather than concentrated toward combustion zones. Power efficiency suffers because electromagnetic energy occupying non-target regions provides no suppression benefit while consuming source power. Interference potential increases because unfocused fields may couple into nearby conductors, electronic systems, or sensors causing electromagnetic compatibility problems. For practical industrial deployment, directional electromagnetic emission architectures would concentrate available power toward flames improving efficiency, reduce electromagnetic exposure in non-target directions improving safety and compatibility, enable operation at greater distances through focusing gain, and provide flexibility in system positioning and installation.

Third Technical Limitation—Static Emission Parameters: AFRL electromagnetic suppression systems utilized static emission parameters without adaptive modulation capability based on combustion feedback or measured suppression effectiveness. Discharge voltage, current levels, pulse timing, pulse repetition rate, and other operating parameters were predetermined based on power supply capabilities, electrode configurations, and experimental designs rather than adjusted dynamically in response to combustion state measurements. This static parameter approach cannot optimize effectiveness across varying conditions encountered in real deployment scenarios. Different fuel types have different electrical conductivities, ionization characteristics, and flame properties affecting electromagnetic interaction mechanisms. Flame geometries ranging from pool fires to spray flames to gas jets to solid fuel combustion exhibit different spatial distributions and temporal dynamics. Atmospheric conditions including temperature, humidity, and pressure affect ionization efficiency, discharge characteristics, and flame behavior. Static predetermined parameters may be suboptimal or ineffective for actual conditions encountered. Adaptive modulation capability would require combustion state sensors providing measurements of flame characteristics, response to electromagnetic emission, and suppression effectiveness, plus control algorithms systematically varying emission parameters and identifying values producing desired suppression effects.

Fourth Technical Limitation—No Safety Architecture: AFRL electromagnetic suppression systems were not configured with comprehensive safety enforcement architectures suitable for deployment in human-occupied facilities where fire emergencies may occur with personnel potentially present. Safety concerns for high-voltage electromagnetic suppression systems include electrical shock hazards, electromagnetic field exposure with potential health effects, interference with medical devices, electromagnetic compatibility issues affecting building systems, and arc flash hazards. Deploying electromagnetic fire suppression in occupied facilities requires presence detection, exclusion zone computation, emission control preventing activation when personnel detected, hardware-level fail-safe interlocks, warning signals, and integration with building systems. AFRL laboratory demonstrations did not develop such comprehensive safety architectures essential for transition to operational deployment in data centers, manufacturing facilities, or other human-occupied spaces.

Fifth Technical Limitation—Laboratory-Scale Only: AFRL electromagnetic suppression demonstrations employed small-scale laboratory flames under carefully controlled research conditions without addressing numerous engineering considerations required for industrial-scale operational deployment. Practical deployment engineering encompasses power supply architecture, antenna or electrode mounting structures, environmental protection, remote monitoring and control, maintenance access, regulatory compliance, and system integration. The gap between laboratory proof-of-concept and field-deployable operational systems represents substantial engineering development not addressed in research program.

How the Present Disclosure Overcomes AFRL Limitations: The present disclosure advances beyond AFRL laboratory demonstrations through specific innovations enabling practical deployment. Industrial standoff operation is achieved through directional electromagnetic emission structures providing directive gain compensating spreading loss. Adaptive parameter optimization is provided through real-time combustion state sensing combined with parameter variation algorithms and optimization methods. Comprehensive safety enforcement includes multi-modal presence detection, dynamic exclusion zone computation, and hardware-level fail-safe interlocks. Multi-modal synergistic enhancement combines electromagnetic emission with optional ionization, particle, and acoustic subsystems. Complete deployment engineering architecture addresses power supply, structural mounting, environmental protection, communications interfaces, maintenance access, regulatory compliance, and system integration.

Academic Research—Why No Practical Systems Emerged

Academic research has characterized electromagnetic interaction with combustion zones. Mphale and others reported microwave attenuation measurements in fire plumes at X-band frequencies, attributing attenuation to thermal ionization within flame zones. This research characterized flame properties but did not demonstrate suppression applications or propose deployment architectures. Academic investigations focused on characterization and fundamental understanding rather than practical system development. Small-scale laboratory flames under simplified controlled conditions were employed for scientific measurement. Industrial-scale deployment considerations including safety architectures for human-occupied facilities, beam-forming for directional energy delivery, adaptive control for varying conditions, multi-modal enhancement strategies, practical mounting and installation, power supply architecture, environmental protection, regulatory compliance, and transition from laboratory to field operation were not addressed. The present disclosure provides complete deployment architecture, comprehensive safety enforcement, adaptive optimization capability, and multi-modal enhancement absent from academic characterization research.

Prior Patent Art—United States Patent Application Publication 2017/0216646

United States Patent Application Publication Number 2017/0216646 to Choi, published Jul. 27, 2017, describes electromagnetic wave fire suppression and extinguishment using electromagnetic frequencies ranging from approximately 2.5 hertz to 128 gigahertz with power outputs described as approximately 0.1 to 4 watts. The disclosure describes employing predetermined electromagnetic frequency patterns or sequences for fire suppression based on fire characteristics or material properties. While both Choi reference and present disclosure employ electromagnetic emission for combustion modification, fundamental technical differences in approach, capability, and implementation distinguish the present invention through five critical elements.

Element-by-Element Differentiation—Element 1, Power Capability: Choi discloses power outputs of approximately 0.1 to 4 watts. This low power level corresponds to consumer electronics or communication devices but is insufficient for industrial fire suppression at meaningful standoff distances. Electromagnetic field strength decreases with distance according to spreading loss and atmospheric absorption. Achieving sufficient field strength to affect combustion at industrial standoff distances requires substantially higher power than 4 watts maximum. The present disclosure does not limit power levels, accommodating requirements ranging from modest levels for close proximity through substantially higher levels for standoff operation. Power level is selected based on target distance, desired coverage area, and application requirements. System architecture accommodates electromagnetic sources capable of generating power appropriate for industrial deployment including magnetrons with peak powers of tens to hundreds of kilowatts, klystrons with similar power capabilities, or solid-state amplifiers with modular power scaling. Higher power capability enables practical standoff operation providing safety margin and operational flexibility.

Element 2, Parameter Selection and Adaptation: Choi employs predetermined frequency patterns without measuring combustion response or adapting parameters based on feedback during operation. Specific frequencies or frequency sequences are selected based on material type or fire characteristics but selection is predetermined rather than adaptive. System does not measure combustion state during suppression operation and does not adjust parameters in response to measured effectiveness. Static predetermined approach cannot optimize across varying conditions encountered in real deployment. The present disclosure implements adaptive modulation testing multiple emission parameters during operation, measuring combustion response to each parameter variation through thermal imaging detecting temperature changes, ultraviolet sensors measuring emission intensity, visible imaging capturing flame modification, and smoke detectors monitoring combustion products, then selecting parameters producing desired combustion modification based on measured effectiveness. Adaptive approach enables optimization across varying fuel types having different combustion characteristics, atmospheric conditions affecting propagation and ionization, flame geometries requiring different field distributions, and combustion intensities demanding different suppression strategies. Parameters varied include pulse repetition frequency, pulse duration, duty cycle, power level, and emission timing. Optimization algorithms including gradient descent, genetic algorithms, simulated annealing, and Bayesian optimization identify optimal parameter combinations empirically without requiring predetermined libraries.

Element 3, Beam-Forming and Directional Energy Delivery: Choi does not disclose directional emission structures or focused energy delivery to target zones. Electromagnetic emission appears omnidirectional or employs simple antenna structures without directive gain or beam-forming capability. No discussion of concentrating electromagnetic energy along specific axis toward combustion zone. Omnidirectional emission wastes energy in non-target directions and reduces effective field strength at target location for given total power. The present disclosure employs directional emission structures providing focused energy delivery including horn antennas with tapered waveguide geometry providing controlled directivity and beamwidth, parabolic reflector antennas with curved reflecting surface transforming spherical wave from feed into collimated beam, phased array antennas with multiple elements having independent phase control enabling electronic beam steering, lens antennas employing dielectric materials with refractive index profile focusing electromagnetic waves, and electromagnetic metasurfaces with subwavelength structures manipulating wavefront phase and amplitude. Directional structures concentrate energy toward target zone improving efficiency and enabling standoff operation. Electronic beam steering in phased arrays enables rapid redirection for multi-zone coverage.

Element 4, Safety Enforcement Architecture: Choi does not address safety enforcement for deployment in human-occupied environments. Presence detection, electromagnetic field strength monitoring, exclusion zone computation based on exposure guidelines, or fail-safe emission control preventing activation when personnel present are not disclosed. No discussion of safety architectures required for deployment in data centers, manufacturing facilities, commercial buildings, or other occupied spaces where fire emergencies may occur with personnel potentially present. The present disclosure incorporates comprehensive safety enforcement subsystem enabling deployment in human-occupied facilities through presence detection employing multiple sensor modalities including passive infrared detection sensing human thermal signatures, ultrasonic ranging measuring distances, computer vision processing imagery through machine learning classifiers, and microwave presence detection employing Doppler radar sensing motion, exclusion zone computation calculating electromagnetic field strength distribution based on operating parameters and comparing against applicable exposure guidelines, and hardware-level safety interlock implementing emission control through dedicated safety microcontroller and electromechanical relays providing fail-safe behavior even during primary processor failure.

Element 5, Multi-Modal Enhancement Through Synergistic Combination: Choi does not teach combination of electromagnetic emission with ionization generation, particle introduction, or acoustic energy modalities. Electromagnetic wave suppression described as standalone approach without synergistic enhancement through complementary technologies. No discussion of multi-modal architectures combining multiple suppression mechanisms. The present disclosure provides modular architecture enabling optional enhancement subsystems for synergistic suppression capability including ionization enhancement subsystem generating charge carriers through corona discharge, dielectric barrier discharge, radiofrequency discharge, or other ionization techniques, particle generation subsystem introducing particles through ultrasonic atomization, pressure atomization, or electrostatic atomization, and acoustic energy subsystem generating acoustic waves through horn-loaded drivers, parametric arrays, or phased acoustic arrays. Multi-modal combination provides complementary suppression mechanisms potentially enhancing capability beyond single modality approaches.

Summary of Prior Art Limitations: Prior electromagnetic and acoustic suppression approaches share certain fundamental limitations preventing practical deployment. Laboratory demonstrations operated at close proximity without directed beam-forming. Static emission profiles without adaptive modulation were employed. Safety architectures for human-occupied environments were not disclosed. Integration of multiple suppression modalities for synergistic effect was not taught. Power levels disclosed in prior electromagnetic references are insufficient for industrial standoff distances. These limitations have prevented practical deployment in industrial fire suppression or wildfire prevention applications. The present disclosure addresses each identified prior art limitation through specific technical innovations detailed in the following disclosure.

SUMMARY

A multi-modal combustion interruption system is disclosed that may address certain limitations of prior approaches through modular architecture enabling configuration selection based on deployment requirements. The system may operate in various configurations ranging from a baseline electromagnetic emission configuration through enhanced multi-modal configurations incorporating optional ionization enhancement, particle introduction, and acoustic energy modalities.

According to one aspect, a system comprises a detection subsystem configured to identify combustion events and generate combustion state data, an electromagnetic emission subsystem comprising a pulsed energy source and a directional emission structure, a control processor configured to implement adaptive modulation based on measured combustion response, and a safety enforcement subsystem configured to control emission activation based on presence detection.

According to another aspect, the system may further comprise an ionization enhancement subsystem configured to generate charge carriers in air. The ionization enhancement subsystem may employ corona discharge, dielectric barrier discharge, radiofrequency discharge, or other ionization techniques.

According to another aspect, the system may further comprise a particle generation subsystem configured to introduce particles into a target zone. Particles may comprise liquid droplets, solid particles, or combinations thereof. Particle composition, size, and introduction rate may be selected based on application requirements.

According to another aspect, the system may further comprise an acoustic energy subsystem configured to generate acoustic waves. Acoustic frequency, power, and modulation may be selected based on application requirements.

According to another aspect, the control processor may be configured to implement adaptive frequency modulation by testing multiple emission parameters, measuring combustion response to each parameter, and selecting parameters that produce desired combustion modification. This adaptive approach may enable accommodation of varying conditions without requiring predetermined parameter sets.

Without being bound by theory, electromagnetic emission may interact with combustion zones through mechanisms that may include ionization of gas species, electromagnetic force interaction with charged particles, momentum transfer to neutral molecules, and local modification of gas composition including oxygen concentration. Alternative or additional mechanisms may be operative. The disclosed systems and methods are not limited to any particular physical mechanism and may function through mechanisms not fully characterized at present.

DETAILED DESCRIPTION

The following description presents various embodiments of the multi-modal combustion interruption system. These embodiments are illustrative and not limiting. Modifications and variations are contemplated within the scope of the appended claims. Paragraph numbers are provided for reference and do not limit the scope of disclosure.

System Architecture

Figure 1:
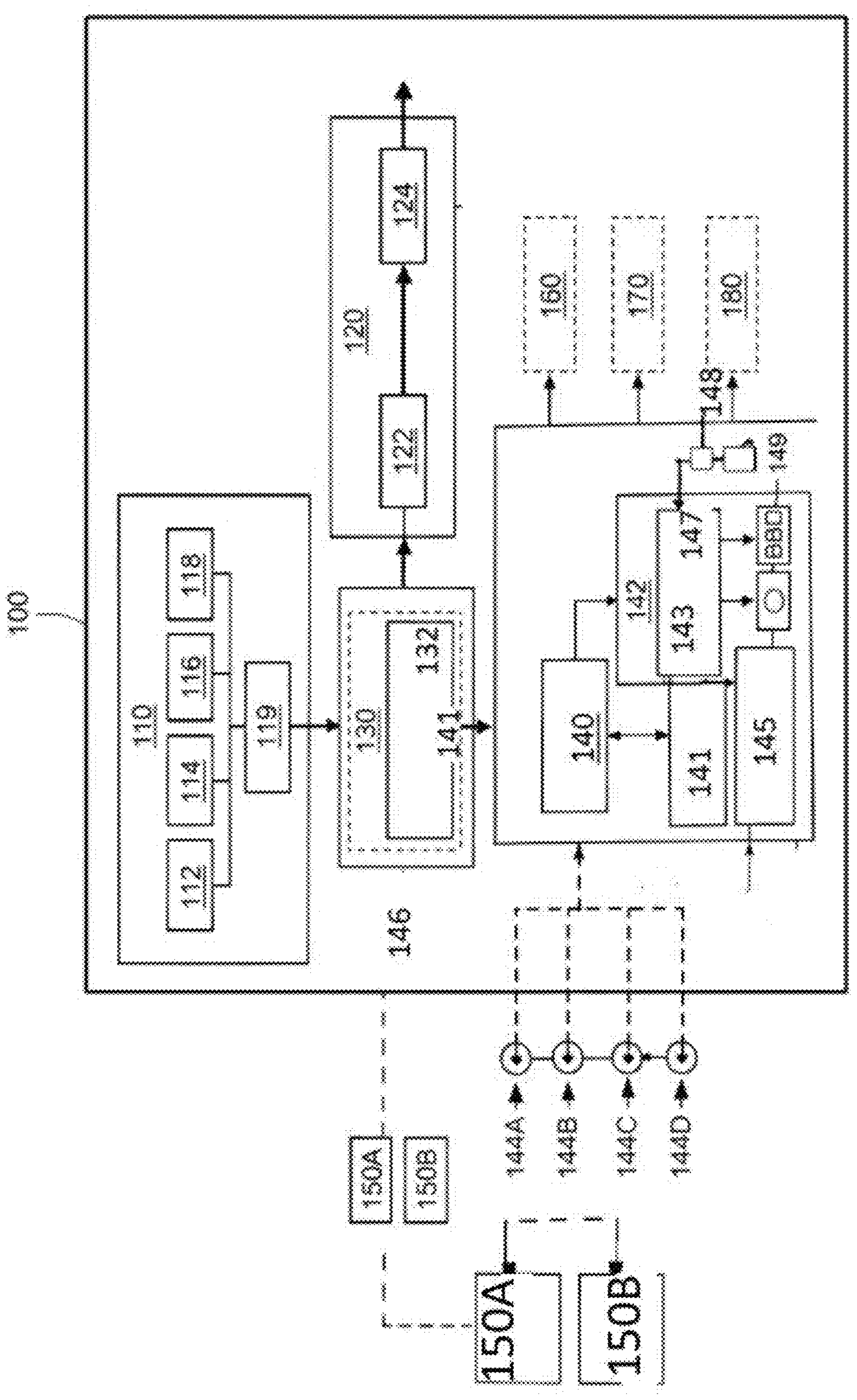
FIG. 1 is a system architecture block diagram illustrating the multi-modal combustion interruption system showing detection subsystem, electromagnetic emission subsystem, control processor, safety enforcement subsystem, and optional enhancement subsystems with interconnections and data flows.

Referring to FIG. 1, a multi-modal combustion interruption system 100 may comprise a detection subsystem 110, an electromagnetic emission subsystem 120, a control processor 130, and a safety enforcement subsystem 140. The system may optionally comprise one or more enhancement subsystems including an ionization enhancement subsystem 160, a particle generation subsystem 170, and an acoustic energy subsystem 180.

The modular architecture enables system configuration based on application requirements. A baseline configuration may employ electromagnetic emission alone providing fundamental combustion interruption capability. Enhanced configurations may incorporate one or more optional subsystems providing synergistic enhancement. The control processor may enable or disable subsystems based on application profile, environmental conditions, or user preference allowing flexible deployment across diverse scenarios.

Detection Subsystem

The detection subsystem 110 may comprise one or more sensors configured to detect combustion signatures. Sensor modalities may include thermal imaging, ultraviolet spectroscopy, visible light imaging, smoke detection, or combinations thereof providing comprehensive combustion detection capability.

In one embodiment, thermal imaging may employ an uncooled microbolometer array operating in long-wave infrared spectrum providing spatial temperature distribution measurements. In another embodiment, ultraviolet detection may employ a solar-blind detector responsive to characteristic combustion emissions from excited OH and CH radicals while rejecting background solar radiation. In another embodiment, visible light imaging may employ silicon-based sensors with computer vision algorithms processing imagery for flame signature identification. In another embodiment, smoke detection may employ optical scattering, ionization chambers, or aspiration sampling providing early warning before visible flame development.

Multiple sensor types may be combined for enhanced detection confidence through sensor fusion. Fusion algorithms may employ Bayesian methods combining probabilistic detection estimates from multiple sensors, or machine learning classifiers processing multi-modal feature vectors. Spatial registration between sensor modalities enables precise combustion zone localization supporting targeted suppression.

The detection subsystem may generate combustion state data including spatial location in facility reference coordinates, thermal characteristics including peak temperature and temperature distribution, spectroscopic signatures indicating combustion species identification, and temporal evolution tracking flame development rate and propagation direction. This data may be provided to the control processor for suppression decision-making and adaptive parameter selection.

Electromagnetic Emission Subsystem

The electromagnetic emission subsystem 120 comprises a pulsed energy source 122 and a directional emission structure 124. The pulsed energy source may comprise various electromagnetic source technologies capable of generating pulsed emission at suitable power levels.

In one embodiment, the pulsed energy source may comprise a magnetron having a cylindrical cathode heated by filament current, surrounding anode block with resonant cavities, and permanent magnets generating axial magnetic field perpendicular to radial electric field. Crossed-field interaction between electrons emitted from cathode produces RF generation through cyclotron resonance. Magnetrons can provide peak powers from kilowatts to hundreds of kilowatts with high efficiency.

In another embodiment, the pulsed energy source may comprise a klystron having electron gun, input cavity receiving drive signal, bunching sections providing velocity modulation, and output cavity extracting RF power from bunched beam. Klystrons provide high gain and power amplification with good efficiency and controllability.

In another embodiment, the pulsed energy source may comprise solid-state radio frequency amplifiers using semiconductor devices such as gallium nitride or silicon carbide high electron mobility transistors. Multiple amplifier modules may be combined in parallel for power scaling. Solid-state sources provide rapid switching, precise control, and modular construction.

In another embodiment, the pulsed energy source may comprise a traveling wave tube having electron gun, slow-wave structure providing continuous interaction between electron beam and RF wave, and collector. Traveling wave tubes provide broadband operation and high power capability.

Operating frequency may be selected from Industrial, Scientific, and Medical frequency bands including common allocations such as 915 MHz, 2.45 GHZ, 5.8 GHZ, or 24.125 GHz, or other suitable frequencies based on regulatory requirements and application characteristics. Frequency selection considers atmospheric propagation characteristics, antenna sizing, and available source technologies.

Peak power may be selected based on target distance, desired coverage area, and application requirements. Pulse duration, duty cycle, and repetition rate may be adjusted based on application constraints including available power, thermal management of source components, and adaptive modulation requirements enabling parameter variation.

The directional emission structure 124 may comprise various beam-forming architectures providing focused electromagnetic energy delivery. In one embodiment, the directional structure may comprise a horn antenna having tapered waveguide geometry transitioning from small input to larger aperture output. Flare angle and aperture dimensions determine gain and beamwidth according to aperture antenna theory.

In another embodiment, the directional structure may comprise a parabolic reflector antenna having curved reflecting surface with parabolic profile and feed antenna positioned at focal point. Parallel rays from focal point reflect into collimated beam. Reflector diameter determines gain and beamwidth.

In another embodiment, the directional structure may comprise a phased array antenna having multiple radiating elements with individual phase shifters. Electronic control of element phases enables beam steering without mechanical motion. Beam direction determined by progressive phase shift across array. Phased arrays enable rapid beam redirection for multi-zone coverage.

In another embodiment, the directional structure may comprise a lens antenna employing dielectric materials with controlled refractive index profile focusing electromagnetic waves analogous to optical lenses. In another embodiment, the directional structure may comprise an electromagnetic metasurface having planar structure with subwavelength periodic elements controlling transmitted or reflected electromagnetic wavefronts for beam shaping.

The directional structure focuses electromagnetic energy along a suppression axis toward a target zone. Antenna gain and beamwidth may be selected based on coverage requirements and installation geometry. Higher gain provides longer range but narrower coverage. Lower gain provides wider coverage at shorter range. Selection depends on deployment scenario.

Ionization Enhancement Subsystem

The optional ionization enhancement subsystem 160 may generate charge carriers in air or other gases enhancing electromagnetic coupling efficiency to combustion zones. Various ionization techniques may be employed including but not limited to corona discharge, dielectric barrier discharge, radiofrequency discharge, electron beam ionization, or photoionization. The selection of ionization technique may be based on application requirements including target ionization density, available power, operational environment, and compatibility with other subsystems.

In one embodiment employing corona discharge, one or more electrodes may be energized to voltage levels sufficient to generate corona typically in the range of tens of kilovolts. Corona discharge occurs when electric field strength at electrode surface exceeds the breakdown threshold of surrounding gas creating localized ionization without complete arc formation. Electrode geometry including sharp points, thin wires, or blade edges creates regions of intense electric field enabling corona onset at modest applied voltages. Sharp features with small radius of curvature concentrate electric field according to relationship between field strength and surface radius. Corona ionization generates both positive ions and free electrons through electron impact ionization processes. Electrode polarity affects discharge characteristics with positive corona from point anodes generating streamer discharge propagating from point toward cathode, while negative corona from point cathodes generates confined glow discharge localized near cathode surface. Ion generation rates and spatial distribution depend on applied voltage magnitude, electrode geometry, inter-electrode spacing, and gas composition and pressure.

For large-area ionization applications requiring uniform charge carrier distribution across extended target volumes, multiple electrodes may be distributed in array configuration. Wire array embodiments may employ multiple parallel wires suspended above ground plane with wire spacing selected to provide overlapping ionization regions ensuring uniform coverage across array width. Wire diameter typically ranges from sub-millimeter to several millimeters with smaller diameter enabling lower corona onset voltage but reduced mechanical strength. Wire height above ground plane affects field distribution and ionization uniformity with typical heights ranging from tens of millimeters to hundreds of millimeters depending on required coverage area and field strength distribution. Applied voltage may be DC or pulsed with magnitude selected to achieve desired ionization density while avoiding transition to arc discharge. Alternative array configurations include rod arrays with multiple vertical electrodes distributed spatially, or brush electrodes with multiple sharp features per electrode providing high ion generation density.

In another embodiment, dielectric barrier discharge may be employed providing stable diffuse plasma generation without requiring vacuum conditions. Dielectric barrier discharge configurations comprise parallel plate electrodes separated by narrow gas gap with one or both electrodes covered by dielectric barrier material preventing direct electrical contact and arc formation. Dielectric materials may include glass, ceramic, polymer films, or other insulating materials with appropriate dielectric strength and thickness. Applied voltage typically comprises alternating current in frequency range from power frequency at 50 or 60 Hz through tens of kilohertz depending on gap geometry, gas composition, and desired discharge characteristics. Gas gap spacing typically ranges from sub-millimeter to several millimeters with smaller gaps enabling lower operating voltage while larger gaps provide greater ionization volume.

The dielectric barrier prevents sustained arc discharge by limiting current flow through accumulated surface charge. During positive half-cycle of applied voltage, electrons are accelerated across gas gap ionizing gas molecules through electron impact. Generated ions and electrons migrate under field influence with electrons moving toward anode and positive ions toward cathode. Electrons reaching dielectric-covered anode accumulate at dielectric surface creating surface charge that reduces effective electric field across gas gap. When field reduces below sustaining threshold, discharge self-terminates. During negative half-cycle, voltage polarity reverses and discharge re-ignites with opposite polarity. This cyclic process generates thousands of short-duration micro-discharge events per second distributed across electrode area. Individual micro-discharges appear as fine filaments or channels but collective effect produces approximately uniform ionization across gap. Discharge appearance depends on operating conditions with filamentary mode characterized by distinct channel formation or diffuse mode producing more uniform glow depending on gas composition, pressure, gap spacing, and voltage magnitude.

In another embodiment, radiofrequency discharge may be employed generating plasma through electromagnetic coupling at radio frequencies. Radiofrequency discharge configurations include capacitive coupling with parallel plate electrodes driven by RF voltage source, or inductive coupling with coil carrying RF current generating time-varying magnetic field. Capacitive RF discharge applies RF voltage typically at frequency of 13.56 MHz corresponding to Industrial, Scientific, and Medical band allocation, or other frequencies based on regulatory approval and discharge optimization. Parallel plate electrodes separated by gap containing gas to be ionized experience alternating electric field driving electron oscillation. High-frequency field acceleration imparts sufficient energy to electrons for ionization through electron impact with neutral gas molecules. Gap spacing and pressure are selected to favor glow discharge mode over arc mode with lower pressures ranging from sub-atmospheric to several hundred pascals enabling efficient glow discharge generation at moderate RF power levels. Atmospheric pressure operation is possible with higher power density requirements but eliminates vacuum system complexity.

Inductive RF discharge generates plasma through electromagnetic induction according to Faraday's law. Planar coil or helical coil carrying RF current creates time-varying magnetic field passing through adjacent gas volume. Induced electric field circulates in closed loops perpendicular to magnetic field axis accelerating free electrons. Accelerated electrons gain energy from induced field and ionize neutral molecules through collisions. Inductive coupling provides efficient energy transfer particularly at lower gas pressures and can generate higher plasma density than capacitive coupling under comparable power conditions. Coil configuration affects field distribution with planar spiral coils providing uniform field distribution over flat surface areas while helical coils provide cylindrical plasma volumes suitable for tube or channel ionization.

Particle Generation Subsystem

The optional particle generation subsystem 170 may introduce particles into target zones providing additional suppression mechanisms. Particles may be selected from various materials based on application requirements and environmental compatibility considerations. Suitable particles may include but are not limited to liquid droplets of various compositions, solid particles including powders or aerosols, or combinations thereof. Particle selection considers multiple factors including interaction with electromagnetic fields, heat absorption capacity, oxygen displacement effectiveness, chemical reactivity or inertness, environmental impact, equipment compatibility, and cleanup requirements.

Particle size distribution affects suppression effectiveness through surface area to volume ratio impacting heat transfer, evaporation rate, and aerodynamic behavior. Smaller particles provide greater surface area per unit mass enhancing heat absorption and oxygen displacement efficiency but require more power for generation and may be more susceptible to drift in air currents. Larger particles carry more momentum enabling deeper penetration into combustion zones but provide less surface area for heat exchange. Optimal particle size depends on application with typical ranges from micrometers to hundreds of micrometers. Particle composition selection considers application constraints with water droplets providing advantages of availability, environmental compatibility, and high heat capacity but presenting concerns for water-sensitive equipment including electronics, electrical components, or water-reactive materials. For applications involving water-sensitive equipment such as data centers, server rooms, electronic manufacturing facilities, or electrical substations, the particle generation subsystem may be omitted entirely or configured to employ alternative particle types including inert solid particles, non-conductive liquids, or specialized suppressant materials.

Particle generation techniques provide various mechanisms for producing controlled particle distributions. In one embodiment, ultrasonic atomization employs high-frequency mechanical vibration to generate fine droplets from liquid surfaces. Piezoelectric transducer vibrating at ultrasonic frequency typically ranging from 20 kilohertz to several megahertz contacts liquid surface or thin liquid film. Acoustic energy couples into liquid generating capillary waves on surface. Wave amplitude grows through acoustic driving force until wave crests become unstable ejecting fine droplets. Droplet size scales inversely with ultrasonic frequency according to approximate relationship involving surface tension, liquid density, and frequency. Higher frequencies generate smaller droplets typically in range of single-digit micrometers while lower frequencies produce larger droplets. Ultrasonic atomization provides narrow size distribution compared to pressure atomization with coefficient of variation typically in range of 20 to 40 percent enabling controlled particle characteristics. Transducer construction includes piezoelectric ceramic element bonded to metal backing plate with electrical leads providing RF drive signal from power amplifier. Liquid supply system delivers controlled flow rate to transducer surface. Generated droplets may be captured by collection cone or shroud and directed into air stream for transport to target zone. Continuous high-power operation may require cooling to prevent transducer overheating and performance degradation.

In another embodiment, pressure atomization employs fluid pressure to force liquid through nozzle orifice creating high-velocity jet that breaks into droplets. Pump pressurizes liquid to range typically from 50 to 500 pounds per square inch or higher forcing flow through small orifice. Liquid jet emerging from orifice undergoes Rayleigh-Taylor instability caused by velocity difference between jet and surrounding air combined with surface tension effects. Instability causes jet breakup into droplets with size depending on orifice diameter, liquid pressure, flow velocity, liquid viscosity and surface tension, and aerodynamic forces. Droplet size typically ranges from 10 to 100 micrometers with wider size distribution compared to ultrasonic atomization. Nozzle designs provide various spray patterns including simple orifice producing relatively narrow jet, hollow cone nozzles generating conical spray sheet with material concentrated at cone surface, full cone nozzles producing filled conical distribution, and flat fan nozzles creating planar spray sheet suitable for linear coverage. Spray angle and pattern shape are selected based on coverage requirements with wider angles providing broader area coverage at reduced throw distance. Multi-nozzle arrays employ multiple nozzles arranged spatially to provide uniform distribution across extended target areas with manifold distributing pressurized liquid to nozzles and individual flow controls enabling pattern adjustment and compensation for nozzle variations.

In another embodiment, electrostatic atomization employs electric field stress to generate charged droplets from liquid surfaces. Liquid reservoir or capillary tube is brought to high voltage typically ranging from 5 to 15 kilovolts relative to ground or counter electrode. Electric field stress at liquid surface overcomes surface tension when field strength exceeds critical value determined by liquid properties. Liquid surface deforms into conical shape known as Taylor cone with jet emission from cone apex. Emitted jet breaks into droplets through Rayleigh instability with jet diameter and breakup length determining droplet size. Droplets carry electric charge from parent liquid providing electrostatic repulsion preventing coalescence and maintaining size distribution. Droplet size is controlled by liquid flow rate and applied voltage with typical sizes in range of single-digit micrometers to tens of micrometers. Electrostatic charging prevents droplet coalescence during flight and enhances dispersion through mutual repulsion. Alternative configuration employs conventional spray generation followed by charging through transit past corona discharge region where droplets acquire charge through ion attachment. Charged droplets experience electrostatic dispersion improving spatial distribution and may be directed or focused using electric fields.

Acoustic Energy Subsystem

The optional acoustic energy subsystem 180 may generate acoustic waves providing additional mechanism for combustion modification. Acoustic frequency, power level, and modulation characteristics may be selected based on application requirements including target flame characteristics, operating environment, and desired acoustic effects. Acoustic transducers convert electrical power into acoustic pressure waves through various physical mechanisms.

In one embodiment, horn-loaded compression drivers may be employed providing efficient acoustic generation with controlled directivity. Compression driver includes diaphragm driven by electromagnetic voice coil similar to loudspeaker construction but operating into compression chamber with small throat opening. Diaphragm motion compresses air in chamber generating high pressure amplitude. Compressed air exits through throat into horn structure providing impedance matching between small throat and larger free space. Horn geometry with expanding cross-sectional area transforms high pressure low volume velocity at throat to lower pressure higher volume velocity at horn mouth enabling efficient acoustic power transfer to far field. Horn directivity increases with frequency providing narrower beam at higher frequencies. Horn designs include exponential horns with smoothly expanding profile, conical horns with linear taper, and tractrix horns with mathematically optimized expansion profiles.

In another embodiment, parametric acoustic arrays may generate highly directional low-frequency beams using nonlinear acoustic interaction. Array comprises multiple ultrasonic transducers generating high-frequency carrier waves with amplitude modulation at desired low-frequency signal. Ultrasonic waves propagate as collimated beam due to small wavelength relative to array size. Nonlinear acoustic propagation in air causes wave distortion and frequency mixing generating difference frequency component corresponding to modulation frequency. Difference frequency propagates along ultrasonic beam path creating highly directional low-frequency sound from relatively compact array. Parametric arrays provide superior directivity compared to conventional low-frequency sources of similar size because directivity is determined by ultrasonic carrier wavelength rather than difference frequency wavelength.

In another embodiment, phased acoustic arrays employ multiple transducers with independent drive signals enabling electronic beam steering and pattern synthesis. Array elements are arranged in one-dimensional linear array or two-dimensional planar array with element spacing typically near half-wavelength of operating frequency. Individual element drive signals have controlled amplitude and phase relationships determining far-field radiation pattern. Progressive phase shift across array elements steers main beam direction without mechanical motion. Phase distribution is computed based on desired beam pointing angle and element positions. Amplitude weighting applied to element drive signals controls sidelobe levels and beam shape with tapered distributions reducing sidelobes at expense of slightly broader main beam. Phased arrays enable rapid beam scanning for multi-zone coverage, adaptive pattern synthesis for interference mitigation, and null steering to reduce acoustic exposure in specific directions. The acoustic subsystem may operate at frequencies and intensities selected to achieve desired gas density modulation, flame structure perturbation, or other acoustic effects while maintaining safe exposure levels for personnel.

Adaptive Modulation

The control processor 130 may implement adaptive modulation of emission parameters based on measured combustion response enabling optimization across varying conditions without requiring predetermined parameter libraries. Upon detection of combustion event by detection subsystem, the control processor may execute characterization sequence testing multiple parameter combinations and measuring combustion response to identify effective parameter values.

The adaptive modulation process begins with baseline measurements captured with electromagnetic emission inactive establishing reference combustion characteristics. Baseline data includes temperature distribution from thermal imaging, ultraviolet emission intensity from UV sensors, visible flame structure from cameras, and smoke concentration from smoke detectors. These measurements characterize unperturbed combustion state providing comparison reference for evaluating suppression effectiveness.

Following baseline establishment, electromagnetic emission is activated with initial parameter values selected from default settings, previous successful parameters for similar events, or systematic exploration starting point. Initial parameters include pulse repetition frequency determining temporal pattern of energy delivery, pulse duration controlling energy per pulse, duty cycle determining average power as fraction of peak power, and instantaneous power level setting field strength magnitude. During emission, sensors continuously monitor combustion state capturing response to electromagnetic exposure with timing synchronized to emission pulses enabling correlation between parameters and effects.

Parameter variation proceeds systematically exploring parameter space to identify effective combinations. Multiple strategies are available including one-dimensional sweep varying single parameter while holding others constant which provides simple implementation but requires many measurements and may miss multi-parameter interactions, multi-dimensional scan varying multiple parameters simultaneously on grid pattern providing comprehensive coverage but with exponentially increasing measurements as parameter count grows, or adaptive sampling concentrating measurements in promising regions based on observed responses providing efficiency but requiring sophisticated sampling algorithms. Parameter selection strategy depends on available time, computational resources, and optimization requirements with faster strategies preferred when suppression urgency is high.

For each parameter combination tested, combustion response is measured and quantified through effectiveness metrics converting raw sensor data into scalar or vector performance indicators suitable for optimization algorithms. Example metrics include maximum temperature reduction measuring peak cooling magnitude indicating suppression intensity, temperature reduction integral computing spatial extent of cooling effect, flame displacement magnitude measuring physical flame movement under electromagnetic forcing, ultraviolet emission reduction ratio indicating changes in ionization levels and combustion chemistry, or multi-objective composite metrics balancing multiple performance goals. Effectiveness database maintains mapping between parameter combinations and resulting metrics building empirical model of system behavior for current combustion event.

Combustion response metrics may be computed from sensor measurements and may include one or more of the following quantitative parameters: (a) Flame area change rate computed as temporal derivative of detected flame boundary area measured in square meters per second; (b) Ultraviolet radical emission intensity delta computed as change in detected UV emission at characteristic wavelengths of 185-260 nanometers indicating OH and CH radical concentration; (c) Thermal gradient slope reduction computed as change in spatial temperature gradient measured by thermal imaging array indicating heat release rate modification; (d) Flame displacement vector magnitude computed from sequential visible light images indicating bulk gas movement under electromagnetic forcing; (e) Ion density proxy variation computed from microwave attenuation or reflection measurements indicating plasma density changes. The effectiveness metric may be computed as weighted combination of multiple response parameters, with weighting coefficients selected based on sensor availability, signal-to-noise ratio, and application priorities.

Optimization algorithm selection determines method for identifying optimal parameters from measured effectiveness data. Multiple algorithms provide different tradeoffs between convergence speed, global optimality, computational requirements, and parameter space characteristics. Gradient descent computes partial derivatives of effectiveness function with respect to each parameter indicating directions of performance improvement. Algorithm steps iteratively in direction of steepest improvement with step size controlling convergence rate and stability. Gradient descent provides rapid local convergence when effectiveness function is smooth and unimodal but may become trapped in local optima for complex multi-modal functions. Mathematical update follows form of next parameter vector equals current parameter vector plus step size times gradient of effectiveness function.

Genetic algorithms maintain population of parameter sets representing candidate solutions. Each population member is evaluated for effectiveness producing fitness score. Selection operator identifies high-performing members for reproduction based on fitness scores with higher fitness increasing selection probability. Crossover operator generates offspring parameter sets by combining parent parameters simulating genetic recombination. Mutation operator introduces random variations in parameter values with small probability maintaining population diversity and enabling exploration of new parameter space regions. Population evolves over multiple generations with average fitness typically improving as effective parameter combinations are identified and propagated. Genetic algorithms provide global search capability avoiding local optima and are suitable for complex multi-modal effectiveness landscapes but require more function evaluations than gradient methods.

Simulated annealing employs probabilistic acceptance of parameter changes inspired by thermal annealing in metallurgy. Algorithm accepts parameter changes that improve effectiveness with certainty while accepting degrading changes with probability depending on degradation magnitude and temperature parameter. High temperature early in optimization allows exploration of distant parameter space regions with frequent acceptance of uphill moves. Temperature gradually reduces according to cooling schedule concentrating search near local optima. Low temperature late in optimization restricts acceptance primarily to improving moves refining parameter values. Acceptance probability for degrading changes follows exponential relationship with effectiveness change divided by temperature. Simulated annealing avoids local optima through probabilistic uphill moves while converging to good solutions as temperature reduces and is suitable for rugged effectiveness landscapes with multiple local optima.

Bayesian optimization builds probabilistic model of effectiveness function from limited observations enabling efficient exploration of expensive-to-evaluate parameter spaces. Gaussian process prior defines probability distribution over possible effectiveness functions with mean function representing expected performance and covariance kernel encoding smoothness assumptions. Each parameter evaluation updates posterior distribution concentrating probability mass near measured values. Acquisition function determines next parameter evaluation location balancing exploitation of high-performing regions indicated by high posterior mean against exploration of uncertain regions with high posterior variance. Expected improvement acquisition integrates probability of improvement over current best performance weighted by improvement magnitude. Bayesian optimization is sample-efficient requiring fewer measurements than grid search or random sampling making it suitable when effectiveness evaluation is time-consuming or resource-intensive.

Convergence criteria determine when optimization completes and sustained suppression commences. Multiple criteria may be evaluated including effectiveness threshold achievement indicating desired suppression level has been reached, parameter change magnitude where successive iterations produce parameter changes below tolerance threshold suggesting convergence to optimum, effectiveness plateau where successive evaluations yield similar effectiveness values indicating diminishing returns from further optimization, iteration limit completion where maximum iteration count is reached preventing indefinite optimization in difficult cases, or time constraint satisfaction where suppression urgency requires immediate action based on best parameters identified within available time budget. When convergence criteria are met, system transitions to sustained operation mode maintaining emission at identified optimal parameters while continuing to monitor combustion response. If combustion conditions change causing effectiveness degradation, adaptive modulation may be re-initiated to adapt parameters to new conditions.

Working-Mode Embodiment for Laboratory Validation: The following describes a procedural embodiment suitable for laboratory validation of adaptive modulation functionality. This embodiment is provided for enablement and does not represent performance claims or warranties. A system is configured with thermal imaging sensor operating at 30 Hz frame rate, ultraviolet detector responsive to 308 nm emission, solid-state RF amplifier operating at 2.45 GHz, and horn antenna providing 15 dBi gain. A controlled test fire is established using liquid fuel in metal pan at distance of 5 meters from emission aperture. Baseline Measurement Phase: System captures thermal imaging frames and UV intensity measurements for 5 seconds with electromagnetic emission inactive, establishing baseline temperature distribution and UV emission level. Parameter Test Sequence: System activates electromagnetic emission with initial parameters: pulse repetition frequency 100 Hz, pulse duration 10 milliseconds, duty cycle 10 percent, peak power 5 kilowatts. After 2 seconds of emission, system captures thermal and UV measurements. System increases pulse repetition frequency to 150 Hz while maintaining other parameters. After 2 seconds, system captures measurements. System returns to 100 Hz and increases pulse duration to 15 milliseconds. After 2 seconds, system captures measurements. System continues testing parameter variations across defined test matrix. Effectiveness Computation: For each tested parameter combination, system computes temperature reduction as difference between baseline and measured peak flame temperature. System computes UV intensity change as ratio of measured to baseline UV emission. Parameter Selection: System identifies parameter combination producing maximum temperature reduction. System activates sustained emission at identified parameters. Result Observation: System continues emission and monitoring, recording temperature evolution and UV emission trends. Operator may terminate sequence at any time. This procedural embodiment demonstrates that person of ordinary skill can practice adaptive modulation using commercially available components without undue experimentation.

Safety Enforcement Subsystem

The safety enforcement subsystem 140 enables deployment in human-occupied facilities through comprehensive safety architecture incorporating presence detection, exclusion zone computation, and fail-safe emission control. The subsystem implements two-level safety design with software-level coordination and hardware-level enforcement ensuring safety function continues during control processor failures or software malfunctions.

Software safety level operating within control processor 130 receives presence sensor inputs and performs exclusion zone computations but does not directly control electromagnetic emission preventing software faults from compromising safety. Software level provides user interface for zone visualization, sensor status monitoring, and system coordination but emission permission decisions are made independently by hardware safety level. This architectural separation ensures that software complexity, potential bugs, communication failures, or processor malfunctions do not enable unsafe emission activation.

Hardware safety level 142 comprises dedicated safety microcontroller 143 operating independently from primary control processor with direct connections to presence sensors through redundant signal paths isolated from primary processor communication channels. Safety microcontroller implements safety decision logic in firmware with watchdog timers monitoring continued operation and voting logic resolving conflicts between multiple sensor inputs. Hardware implementation provides deterministic behavior with guaranteed worst-case response times and continued safety function during primary processor failure conditions.

Presence detection employs multiple sensor modalities providing redundant detection capability and reducing false alarm probability while maintaining high detection reliability. Passive infrared sensors detect human thermal signatures through infrared emission in wavelength range of approximately 8 to 14 micrometers corresponding to human body temperature of approximately 37 degrees Celsius. Multiple passive infrared sensors are positioned to provide overlapping coverage of protected areas eliminating blind spots. Sensor field of view typically spans approximately 90 degrees horizontal by 60 degrees vertical with detection range extending to tens of meters. Ultrasonic ranging sensors employ acoustic echo ranging measuring time-of-flight for reflected acoustic pulses determining distances to objects and people. Narrow acoustic beams scan protected volume with range typically from 0.5 to 10 meters and range resolution of approximately 1 centimeter. Computer vision cameras capture visible or thermal imagery processed by machine learning classifiers trained on human detection recognizing human figures in various poses, clothing, and environmental conditions. Multiple cameras provide stereo vision capability enabling three-dimensional position estimation. Microwave radar sensors employ Doppler frequency shift detection sensing motion through direct measurement of radial velocity. Microwave radiation penetrates non-conductive barriers including walls and doors detecting personnel in adjacent spaces not directly visible to optical sensors.

Exclusion zone computation calculates electromagnetic field strength distribution in space surrounding directional emission structure based on operating parameters and compares field strength against applicable exposure guidelines establishing zone boundary where field strength equals exposure limit. Field strength calculation employs electromagnetic propagation models accounting for antenna radiation pattern, directive gain, distance from source, and atmospheric absorption. For directive antenna with known gain factor, field strength at distance r from source is calculated using relationship involving square root of product of radiated power and antenna gain divided by distance accounting for geometric spreading loss. Antenna gain and radiation pattern data provide directional variation showing higher field strength along main beam axis and reduced strength in other directions. Atmospheric absorption coefficients modify field strength for longer propagation distances with absorption increasing at higher frequencies particularly in millimeter wave bands. Calculated field strength distribution is compared against applicable exposure guidelines including limits specified by Institute of Electrical and Electronics Engineers such as Standard C95.1 defining field strength limits at various frequencies, or limits from International Commission on Non-Ionizing Radiation Protection, or regulatory requirements from Federal Communications Commission or equivalent national bodies. Zone boundary represents three-dimensional surface where field strength equals exposure limit creating exclusion volume within which personnel exposure would exceed guidelines.

Dynamic zone updates recalculate boundary in real-time as operating parameters change. If emission power level increases, zone expands outward requiring larger clearance. If beam steering redirects main beam, zone shifts spatially following beam direction. If frequency changes, different exposure limits and atmospheric absorption apply requiring zone recalculation. Computed zone boundaries are transmitted to safety decision logic determining emission permission status.

Safety decision logic evaluates multiple inputs including presence detection from all sensor modalities, exclusion zone boundaries from zone computation, manual control states including emergency stop button status and key switch position, and system health status from self-test results and fault detectors. Logic implements decision tree structure: if emergency stop button is pressed OR presence detected within exclusion zone OR system fault detected OR key switch not enabled, then emission permission signal is set to FALSE prohibiting emission activation, otherwise if all conditions are satisfied with no emergency stop AND no presence in zone AND no faults AND key switch enabled, then emission permission signal is set to TRUE allowing emission when commanded by control processor. Permission signal controls hardware interlock physically interrupting emission power path.

Hardware interlock 146 implements fail-safe emission control through physical interruption of power supply to electromagnetic source. Two interlock implementations provide alternative approaches. Electromechanical relay implementation employs relay coil energized by permission signal controlling normally-open contacts positioned in series with emission source power line. When permission signal is TRUE indicating safe conditions, relay coil is energized closing contacts and enabling power flow to emission source. When permission signal transitions to FALSE indicating unsafe conditions, relay coil is de-energized opening contacts and physically interrupting power to emission source preventing electromagnetic emission. Relay contact ratings are selected to handle switched current and voltage without degradation. Mechanical position indicator shows contact state enabling visual verification of interlock status. Solid-state switch implementation employs optically-isolated driver receiving permission signal, power semiconductor switch such as MOSFET or IGBT with current and voltage ratings suitable for switched power, gate drive circuitry controlling switch state, and status monitoring detecting switch failures. Both implementations provide fail-safe behavior where loss of permission signal, power failure to safety microcontroller, broken connections, or component failures result in emission prohibition maintaining safe state.

Deployment Configurations

The modular system architecture enables configuration selection based on deployment type and application requirements. Two primary deployment categories are contemplated: fixed installations for permanent facility protection and mobile platforms for temporary or emergency deployment.

Fixed installation embodiments are deployed in industrial facilities, commercial buildings, critical infrastructure, or other locations requiring permanent protection. Fixed installations utilize electrical grid power connection eliminating fuel capacity constraints and enabling sustained operation. System complexity may be higher than mobile embodiments as installation is performed by trained personnel and ongoing maintenance by facility staff or contractors is feasible. Multiple protection zones may be established with coordinated sensor networks, distributed emission structures, and centralized or distributed control. Configuration selection considers protected environment characteristics. For environments containing water-sensitive equipment such as data centers, server rooms, telecommunications facilities, or electronic manufacturing, configurations omitting particle generation may be preferred employing electromagnetic emission with optional ionization enhancement. For battery manufacturing, chemical processing, or other industrial applications where particle introduction is acceptable, configurations incorporating particle generation may be employed providing additional suppression mechanisms.

Mobile platform embodiments are configured for vehicle mounting enabling rapid deployment, emergency response, or temporary protection. Mobile platforms utilize self-contained power generation or energy storage including onboard generators, battery banks, fuel cells, or hybrid combinations. Power source selection considers available technology, operational duration requirements, platform weight constraints, and fuel availability. Mobile platform design prioritizes deployment rapidity, operational simplicity, and transportability. System configuration balances suppression capability against deployment constraints including size, weight, power consumption, and setup time. Applications include emergency response for temporary incident coverage, wildfire intervention creating firebreaks or protecting structures, temporary facility protection during construction or maintenance, and mobile infrastructure security.

Power Architecture

The system requires electrical power of capacity appropriate to selected configuration and operational scale. Power may be provided by various sources including but not limited to electrical grid connection, generators employing diesel, gasoline, or natural gas fuels, battery banks using lithium-ion, lead-acid, or other electrochemical storage technologies, fuel cells, solar photovoltaic panels, or combinations thereof. The selection of power source is engineering decision based on application requirements, available infrastructure, and deployment type. The present disclosure relates to combustion interruption system architecture and operation. Power generation technology is separate subject matter. The disclosed system may operate with power sources employing current technology or future improvements in power generation or energy storage capacity.

Theoretical Operating Principles

The following discussion presents theoretical mechanisms that may contribute to system operation. This discussion is provided for understanding and is not limiting. The disclosed systems and methods are not bound to any particular physical mechanism and may operate through mechanisms not fully characterized or through combinations of multiple mechanisms. Alternative or additional mechanisms may be operative.

Electromagnetic fields may interact with combustion zones through various physical mechanisms. High-intensity electromagnetic fields may ionize gas molecules through field emission or thermal ionization processes generating charge carriers including positive ions and free electrons. Ionization cross-sections depend on gas species with molecular oxygen, nitrogen, and combustion products having different ionization thresholds and probabilities. Free electrons gain kinetic energy from oscillating electromagnetic fields through acceleration in field direction. Energetic electrons colliding with neutral molecules may transfer momentum and energy. Cumulative collision effects may generate net momentum transfer to bulk gas producing directed gas flow. Electromagnetic fields may exert forces on charged particles according to Lorentz force relationship involving charge, electric field, velocity, and magnetic field. Accelerated ions and electrons may collide with neutral molecules transferring momentum through elastic and inelastic collisions. Momentum transfer efficiency depends on collision cross-sections, relative velocities, and mass ratios.

Bulk gas movement may displace oxygen-containing air from combustion zones reducing local oxygen concentration available for combustion chemistry. Combustion reactions require oxygen as oxidizer with reaction rates depending on oxygen partial pressure and concentration. Reduced oxygen availability may slow reaction rates or halt combustion if oxygen concentration falls below flammability limits. The magnitude and duration of oxygen modification depends on various factors including electromagnetic field strength, exposure duration, atmospheric conditions, gas flow patterns, and combustion intensity.

Alternative mechanisms may include thermal effects where electromagnetic energy absorption by gas molecules, aerosols, or flame particulates generates localized heating affecting gas density and flow patterns. Pressure wave generation through rapid energy deposition may create acoustic disturbances modifying flame structure. Chemical radical disruption through field interaction with charged combustion intermediates may affect reaction pathways. Plasma formation at sufficient field strengths may generate reactive species influencing combustion chemistry. The relative contribution of various mechanisms may vary based on operating conditions including frequency, power level, pulse characteristics, flame type, fuel chemistry, and atmospheric environment.

Application Embodiments

The disclosed system may be configured for various applications based on specific requirements and environmental constraints. Configuration selection considers factors including protected equipment sensitivity, acceptable suppression modalities, available power, installation constraints, response time requirements, and coverage area.

Data center and telecommunications facility protection may employ configurations using electromagnetic emission with optional ionization enhancement while omitting particle generation to avoid water introduction near sensitive electronic equipment. Server rooms, network operations centers, and telecommunications switching facilities contain equipment worth millions of dollars vulnerable to water damage. Electromagnetic-based suppression provides combustion interruption capability without introducing conductive fluids that could short-circuit electronics or require extensive cleanup. System may utilize grid power typically available in data center facilities with installation as ceiling-mounted units or integration with existing infrastructure including cable trays, overhead structures, or raised floor spaces.

Battery manufacturing facility protection may employ configurations incorporating electromagnetic emission, ionization enhancement, and particle generation providing multi-modal suppression for thermal runaway scenarios in lithium-ion battery formation, testing, or storage areas. Battery manufacturing presents unique fire hazards from lithium, cobalt, and electrolyte materials. Multi-modal approach provides complementary mechanisms with electromagnetic emission affecting flame chemistry, ionization increasing coupling efficiency, and particles providing heat absorption and oxygen displacement. System may be configured to detect battery cell temperature excursions indicating thermal runaway initiation and activate suppression before full combustion develops.

Wildfire intervention applications may employ mobile platforms configured for vehicle mounting enabling deployment ahead of advancing fire fronts. Vehicle-mounted systems may be positioned to create temporary barriers protecting specific structures including homes, commercial buildings, or critical infrastructure. Configuration may incorporate multiple subsystems providing enhanced capability for outdoor applications where particle introduction presents no equipment sensitivity concerns. Operational duration is limited by available power capacity. As mobile power technology advances through improved battery energy density or fuel cell efficiency, extended-duration wildfire applications may become more practical. Current mobile power technologies support limited-duration tactical deployment suitable for structure protection or firebreak establishment.

Prophetic Example—Mobile Platform Operation

The following example describes projected operation of mobile platform system for wildfire intervention application. This example is prophetic representing theoretical performance based on engineering analysis and established physical principles. Actual operational characteristics may vary based on numerous factors including atmospheric conditions, fuel characteristics, fire intensity, equipment performance, and other variables. This example does not constitute warranty or guarantee of performance.

A vehicle-mounted system is configured with electromagnetic emission subsystem employing solid-state amplifier and phased array antenna, ionization enhancement subsystem using corona discharge, particle generation subsystem with pressure atomization, and acoustic energy subsystem with horn-loaded drivers. Platform is positioned at location determined suitable based on terrain analysis, wind conditions, and fire progression modeling. Power generation system is activated and subsystems are brought to operational status. Ionization enhancement generates charge carriers in air volume between emission structure and target combustion zone. Particle generation introduces droplets into ionized air. Acoustic energy modulates gas properties creating density variations.

The electromagnetic emission subsystem is activated with adaptive modulation enabled. Control processor executes parameter characterization sequence varying pulse repetition frequency across range of test values while measuring combustion response through thermal imaging detecting temperature variations and ultraviolet sensors monitoring emission intensity changes. Based on measured responses, processor selects parameter combination showing greatest suppression effectiveness and maintains emission at those values. Thermal sensors detect temperature modification in target zone indicating combustion intensity reduction. The system maintains operation for duration determined by power capacity, fire conditions, and mission objectives. Following operation, subsystems are deactivated and platform may be relocated or returned to standby state. Operational effectiveness depends on numerous factors and this prophetic example illustrates system operation concept without representing validated experimental results or guaranteed performance.

Standards and Regulatory Considerations

System deployment may be subject to various regulations, standards, and guidelines depending on jurisdiction, application, and operating parameters. Regulatory frameworks may include electromagnetic emission regulations, human exposure guidelines, fire protection codes, equipment safety standards, and building codes. Specific requirements may vary by location and may change over time.

In the United States, electromagnetic emission may be regulated by Federal Communications Commission with Industrial, Scientific, and Medical equipment potentially regulated under FCC Part 18 or equivalent provisions. Human exposure to electromagnetic fields may be subject to guidelines such as IEEE Standard C95.1 or recommendations from International Commission on Non-Ionizing Radiation Protection. System designers may configure equipment to operate in accordance with applicable regulations and guidelines for intended jurisdiction and application. International deployment may be subject to different regulatory frameworks with frequency allocations, power limits, exposure guidelines, and equipment standards varying by jurisdiction. The disclosed system architecture may be adapted to various regulatory environments through appropriate parameter selection and configuration.

INDUSTRIAL APPLICABILITY

The disclosed systems and methods may find application in various industrial sectors including but not limited to electronics manufacturing, data center operations, battery production and storage, electrical power generation and distribution, chemical processing, pharmaceutical manufacturing, semiconductor fabrication, historical preservation, wildfire management, emergency response, and critical infrastructure protection. The modular architecture enables configuration adaptation to diverse application requirements allowing deployment across scenarios with varying constraints and performance objectives.

The foregoing description has been presented for purposes of illustration. It is not intended to be exhaustive or to limit the disclosure to the precise forms disclosed. Modifications and variations are possible in light of the teachings herein or may be acquired from practice of the disclosure. The embodiments were chosen to explain principles and practical applications to enable others skilled in the art to utilize the disclosure in various embodiments and with various modifications suited to particular uses contemplated.

Detailed Figure Descriptions

FIG. 1—System Architecture Block Diagram

FIG. 1 illustrates complete architecture of multi-modal combustion interruption system 100 in comprehensive block diagram format showing all subsystem components, interconnections, data signal flows, and control relationships. Detection subsystem 110 occupies upper portion showing thermal imaging sensor 112 depicted with array symbol indicating uncooled microbolometer array operating in 8-14 micrometer wavelength range, ultraviolet detector 114 shown with photodiode symbol indicating solar-blind detector operating in 185-260 nanometer range responsive to OH and CH radical emissions, visible light sensor 116 with camera symbol showing silicon-based imaging with computer vision processing, and smoke detector 118 with particle scatter symbol showing optical or ionization detection capability.

Sensor outputs feed into sensor fusion processor 119 implementing Bayesian fusion algorithms, machine learning classifiers, spatial registration, and confidence scoring providing fused output with spatial location coordinates, thermal characteristics, spectroscopic signatures, and temporal evolution data to control processor. Electromagnetic emission subsystem 120 occupies central portion showing pulsed energy source 122 with selectable options including magnetron 122A with cross-section showing cathode, anode with cavity resonators, permanent magnets, and waveguide output, klystron 122B showing electron gun, resonant cavities, and collector, solid-state amplifier 122C showing semiconductor modules and parallel combination, and traveling wave tube 122D showing electron gun and slow-wave structure.

Directional emission structure 124 shows architecture options including horn antenna 124A with tapered waveguide, parabolic reflector 124B with curved surface and focal point feed, phased array 124C with element array and phase shifters, lens antenna 124D with dielectric material, and metasurface 124E with planar subwavelength elements. Suppression axis indicates directional emission toward target combustion zone. Control processor 130 occupies center receiving combustion data and controlling emission with internal blocks showing event recognition, threat assessment, strategy selection, parameter control, and response evaluation outputting pulse frequency, duration, duty cycle, and power commands.

Adaptive modulation feedback loop prominently illustrated with response measurement from thermal imaging, UV sensors, and visible imaging feeding adaptive optimization block 132 showing parameter characterization, response measurement, effectiveness metrics, and optimization algorithm selection between gradient descent, genetic algorithm, simulated annealing, or Bayesian optimization with parameter space visualization and convergence criteria. Safety enforcement subsystem 140 shows two-level implementation with software safety level 141 in control processor computing exclusion zones without direct emission control, and hardware safety level 142 with dedicated safety microcontroller 143 receiving direct presence sensor inputs through redundant paths.

Presence detection sensors illustrated with passive infrared 144A showing detection zones with thermal signature sensitivity, ultrasonic ranging 144B showing acoustic beam patterns, computer vision 144C showing field of view with classifier, and microwave radar 144D showing Doppler detection zones. Exclusion zone computation block 145 shows field strength calculation, exposure limit comparison, and zone boundary visualization. Emission permission signal path shows logic from presence detection through safety decision logic 151 to hardware interlock 146 shown as relay or solid-state switch in series with emission power with manual emergency stop 147, key switch 148, and status indicators 149. Optional enhancement subsystems shown with dashed outlines indicating modular nature with ionization 160, particle generation 170, and acoustic 180 subsystems. Power architecture shown separately indicating fixed installation grid connection 150A or mobile platform onboard power 150B with notation emphasizing power source separation from system invention. System boundary shows all subsystems within inventive scope.

Figure 2:
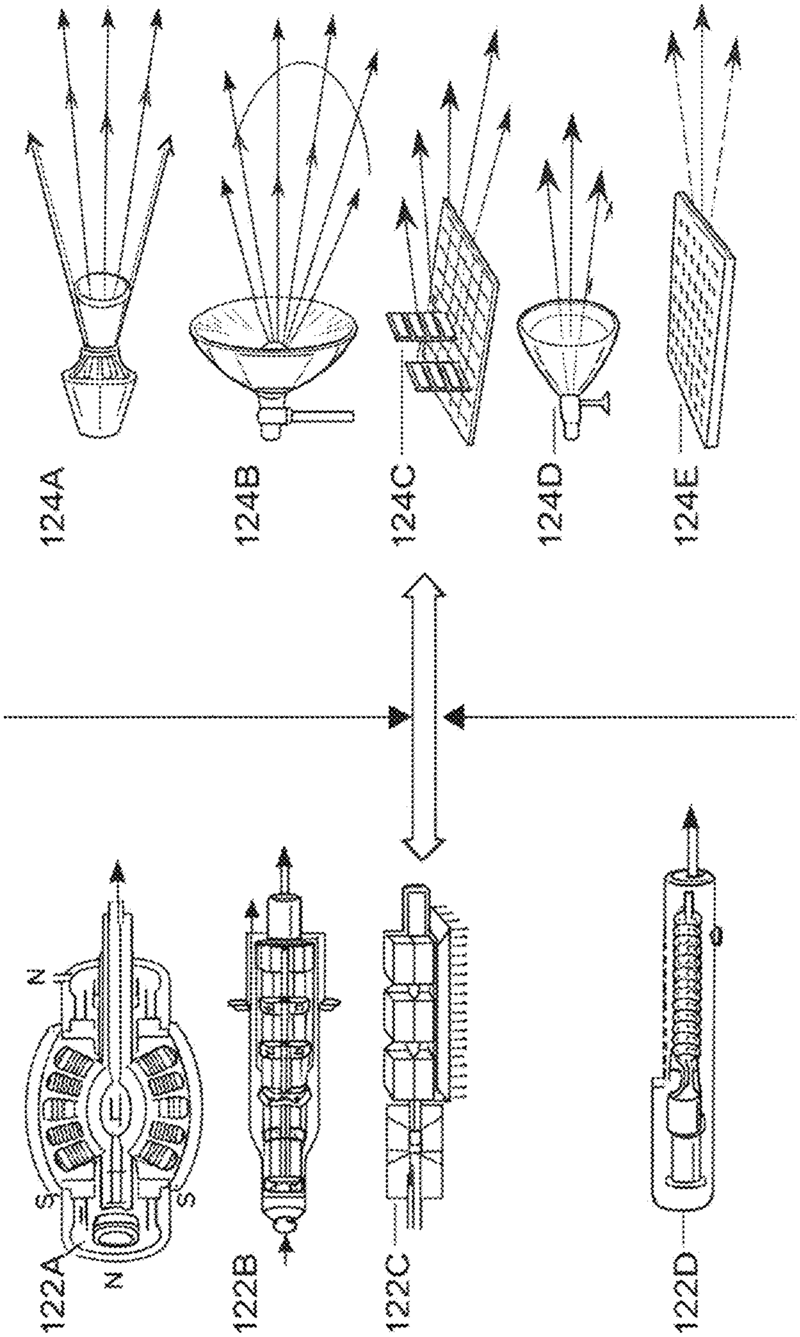
FIG. 2 is a detailed view of the electromagnetic emission subsystem showing pulsed energy source options including magnetron, klystron, solid-state amplifier, and traveling wave tube, plus directional emission structure options including horn antenna, parabolic reflector, phased array, lens antenna, and electromagnetic metasurface.

FIG. 2—Electromagnetic Emission Subsystem Detail

FIG. 2 provides expanded view of electromagnetic emission subsystem 120 showing internal construction and implementation variations. Magnetron detailed cross-section shows cylindrical cathode heated by filament, anode block with resonant cavities, permanent magnets generating axial magnetic field, electron trajectories in crossed fields, RF field patterns, waveguide coupling, and cooling system. Operating principle diagram shows electron emission, acceleration, deflection into cycloid paths, bunching forming rotating space charge, energy transfer from DC to RF, and extraction. Alternative sources show klystron with electron gun, input cavity, bunching drift, intermediate cavities, output cavity, and collector, solid-state with gallium nitride modules and parallel combination, and traveling wave tube with helix slow-wave structure.

Directional emission structures show horn antenna with waveguide input, tapered transition, aperture dimensions determining gain through relationship G equals 4πA over λ squared, and radiation pattern plots. Parabolic reflector shows reflecting surface, feed at focus, collimated output, and gain relationship G equals π D over λ quantity squared times efficiency. Phased array shows element lattice with half-wavelength spacing, phase shifters, amplitude control, corporate feed, and beam steering relationship theta equals arcsine of λ times delta phi over 2π d. Beam steering examples show broadside, 30 degree scan, and 60 degree scan with phase progressions.

Figure 3:
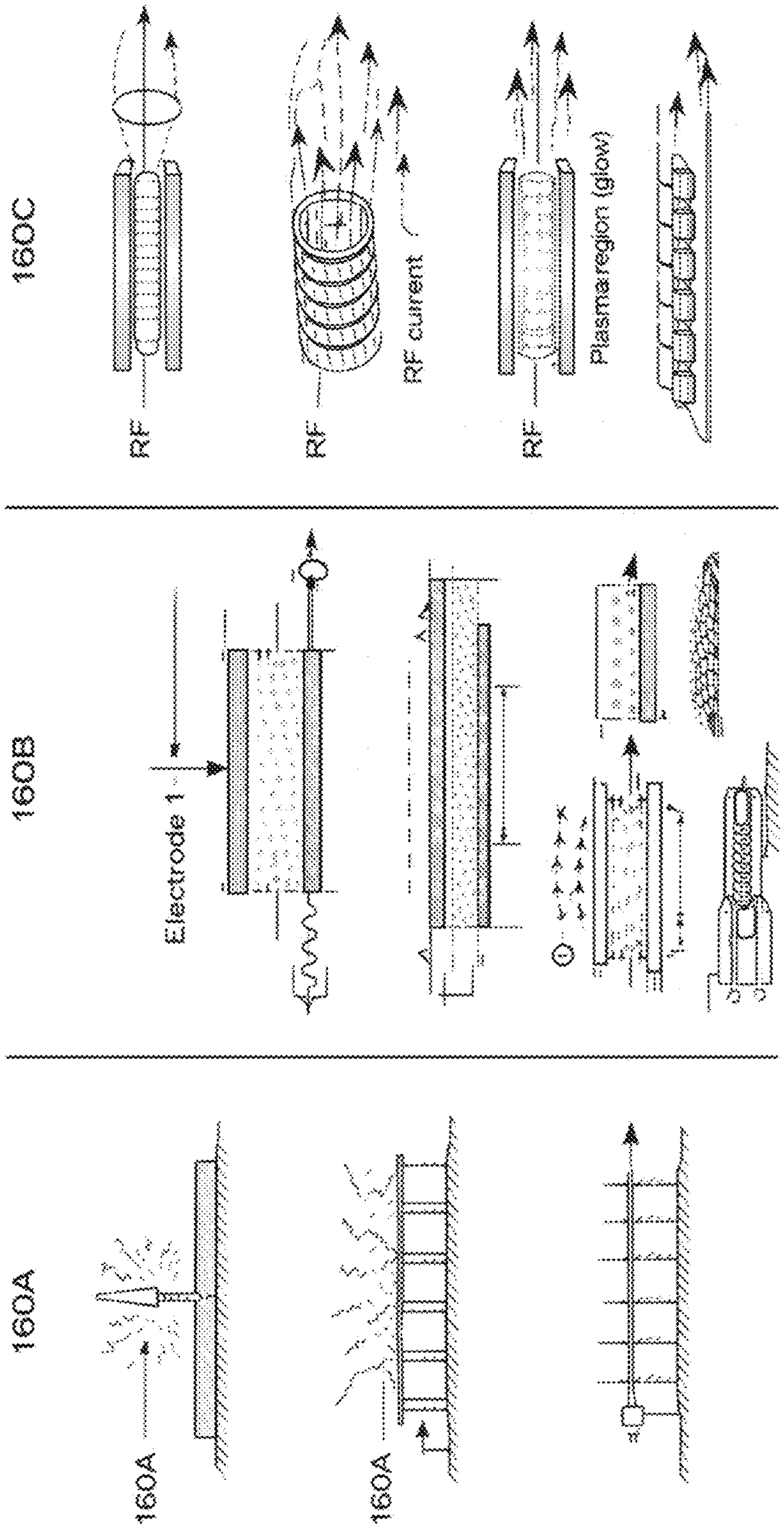
FIG. 3 illustrates ionization enhancement subsystem configurations showing corona discharge, dielectric barrier discharge, and radiofrequency discharge implementations with electrode arrangements and operating principles.

FIG. 3—Ionization Enhancement Configurations

FIG. 3 illustrates ionization generation techniques. Corona discharge 160A shows point-to-plane or wire-to-plane geometry with sharp features creating intense field, corona onset voltage relationship, positive corona streamers and negative corona glow, and wire array with multiple parallel wires for uniform large-area ionization. Dielectric barrier discharge 160B shows parallel plates with dielectric barrier, AC voltage application, gap spacing, operating principle with positive half-cycle electron acceleration, surface charge accumulation, discharge termination, negative half-cycle re-ignition, thousands of micro-discharges per cycle, and diffuse glow appearance. Alternative DBD geometries show coaxial cylinder, surface discharge, and packed-bed reactor.

Radiofrequency discharge 160C shows capacitive coupling with parallel plates at 13.56 MHz, gap and pressure selection for glow mode, and inductive coupling with coil generating time-varying magnetic field inducing electric field through Faraday induction with efficient coupling at lower pressures and higher plasma density. Electrode arrays show multiple units with coordinated control for large-area coverage.

Figure 4:
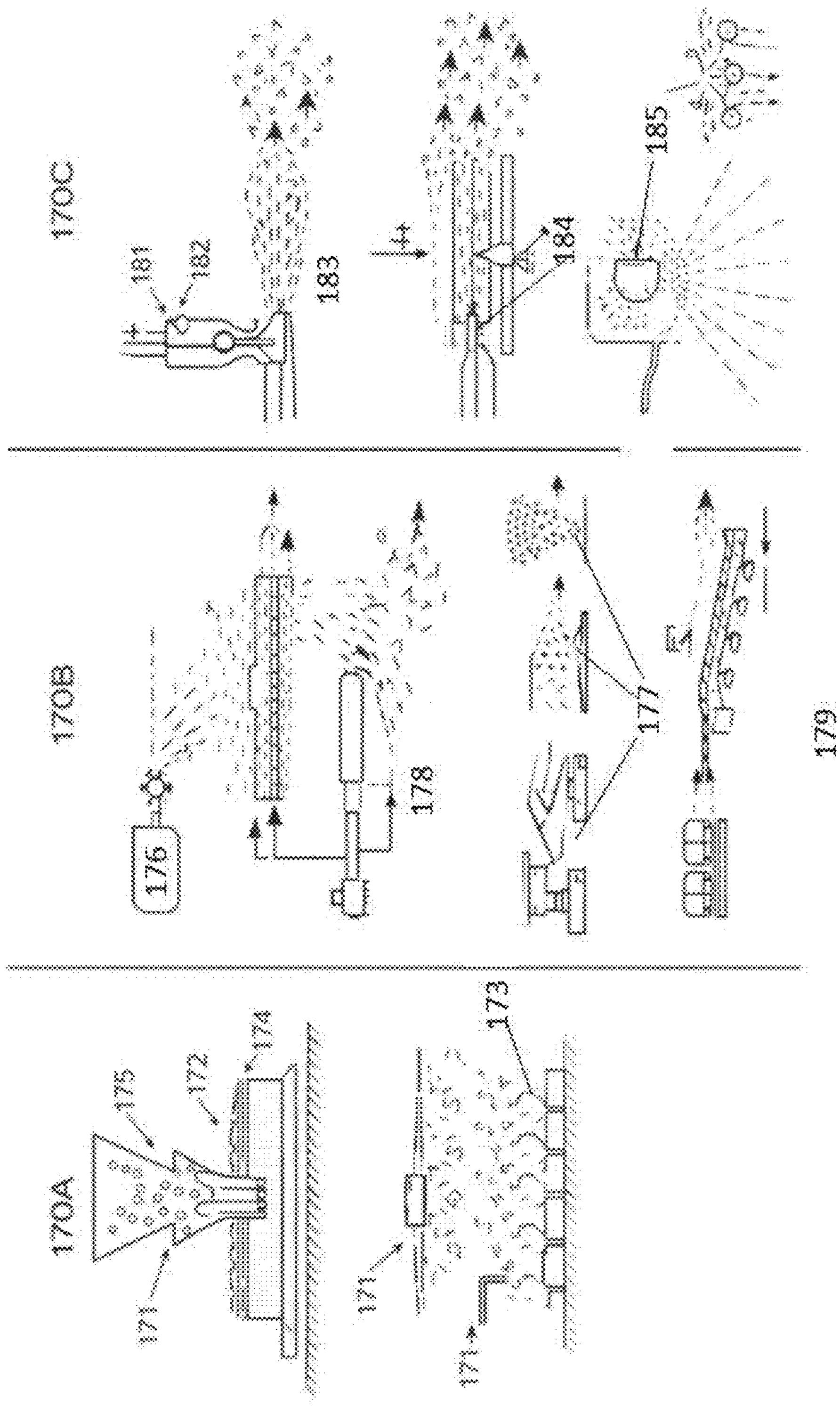
FIG. 4 depicts particle generation subsystem methods showing ultrasonic atomization, pressure atomization, and electrostatic atomization techniques with generation mechanisms and droplet characteristics.

FIG. 4—Particle Generation Methods

FIG. 4 depicts particle generation subsystem methods showing three atomization techniques with detailed component identification and operating principles. Ultrasonic atomization 170A employs piezoelectric transducer 171 vibrating at frequencies ranging from 20 kilohertz to 10 megahertz. Piezoelectric transducer 171 contacts liquid surface 172 coupling acoustic energy into liquid generating capillary waves 173 on liquid surface 172. Capillary wave amplitude grows through acoustic driving force until wave crests become unstable ejecting fine droplets 174. Droplet size scales inversely with ultrasonic frequency with higher frequencies generating smaller droplets typically in range of 1 to 10 micrometers while lower frequencies produce larger droplets. Collection shroud 175 captures generated droplets and directs into air stream for transport to target zone. Ultrasonic atomization provides narrow size distribution compared to pressure atomization with coefficient of variation typically in range of 20 to 40 percent enabling controlled particle characteristics. Transducer construction includes piezoelectric ceramic element bonded to metal backing plate with electrical leads providing RF drive signal from power amplifier. Continuous high-power operation may require cooling to prevent transducer overheating and performance degradation. Alternative ultrasonic configuration shows transducer oriented horizontally with droplet generation and collection.

Pressure atomization 170B employs pump 176 pressurizing liquid to pressure range typically from 50 to 500 pounds per square inch or higher forcing flow through nozzle 177 with small orifice. Liquid jet 178 emerging from nozzle orifice undergoes Rayleigh-Taylor instability caused by velocity difference between jet and surrounding air combined with surface tension effects. Instability causes jet breakup into droplets 179 with size depending on orifice diameter, liquid pressure, flow velocity, liquid viscosity and surface tension, and aerodynamic forces. Droplet size typically ranges from 10 to 100 micrometers with wider size distribution compared to ultrasonic atomization. Nozzle designs provide various spray patterns. Simple orifice nozzle produces relatively narrow jet with concentrated spray. Hollow cone nozzle generates conical spray sheet with material concentrated at cone surface providing annular distribution. Full cone nozzle produces filled conical distribution with droplets throughout cone volume. Flat fan nozzle creates planar spray sheet suitable for linear coverage applications. Spray angle and pattern shape are selected based on coverage requirements with wider angles providing broader area coverage at reduced throw distance. Multi-nozzle array employs multiple nozzles 177 arranged spatially to provide uniform distribution across extended target areas with manifold distributing pressurized liquid to nozzles and individual flow controls enabling pattern adjustment and compensation for nozzle variations.

Electrostatic atomization 170C employs high voltage source 181 providing voltage typically ranging from 5 to 15 kilovolts applied to liquid capillary or reservoir 182. Electric field stress at liquid surface overcomes surface tension when field strength exceeds critical value determined by liquid properties. Liquid surface deforms into conical shape known as Taylor cone 183 with jet emission 184 from cone apex. Emitted jet 184 breaks into droplets 185 through Rayleigh instability with jet diameter and breakup length determining droplet size. Droplets 185 carry electric charge from parent liquid providing electrostatic repulsion preventing coalescence and maintaining size distribution. Droplet size is controlled by liquid flow rate and applied voltage with typical sizes in range of 1 to 10 micrometers. Electrostatic charging prevents droplet coalescence during flight and enhances dispersion through mutual repulsion as shown by diverging droplet trajectories. Taylor cone 183 formation with jet 184 and charged droplet cloud 185 shown under influence of electric field. Alternative configuration employs conventional spray generator producing uncharged droplets followed by charging through transit past corona discharge region where droplets acquire charge through ion attachment. Charged droplets experience electrostatic dispersion improving spatial distribution and may be directed or focused using electric fields.

Figure 5:
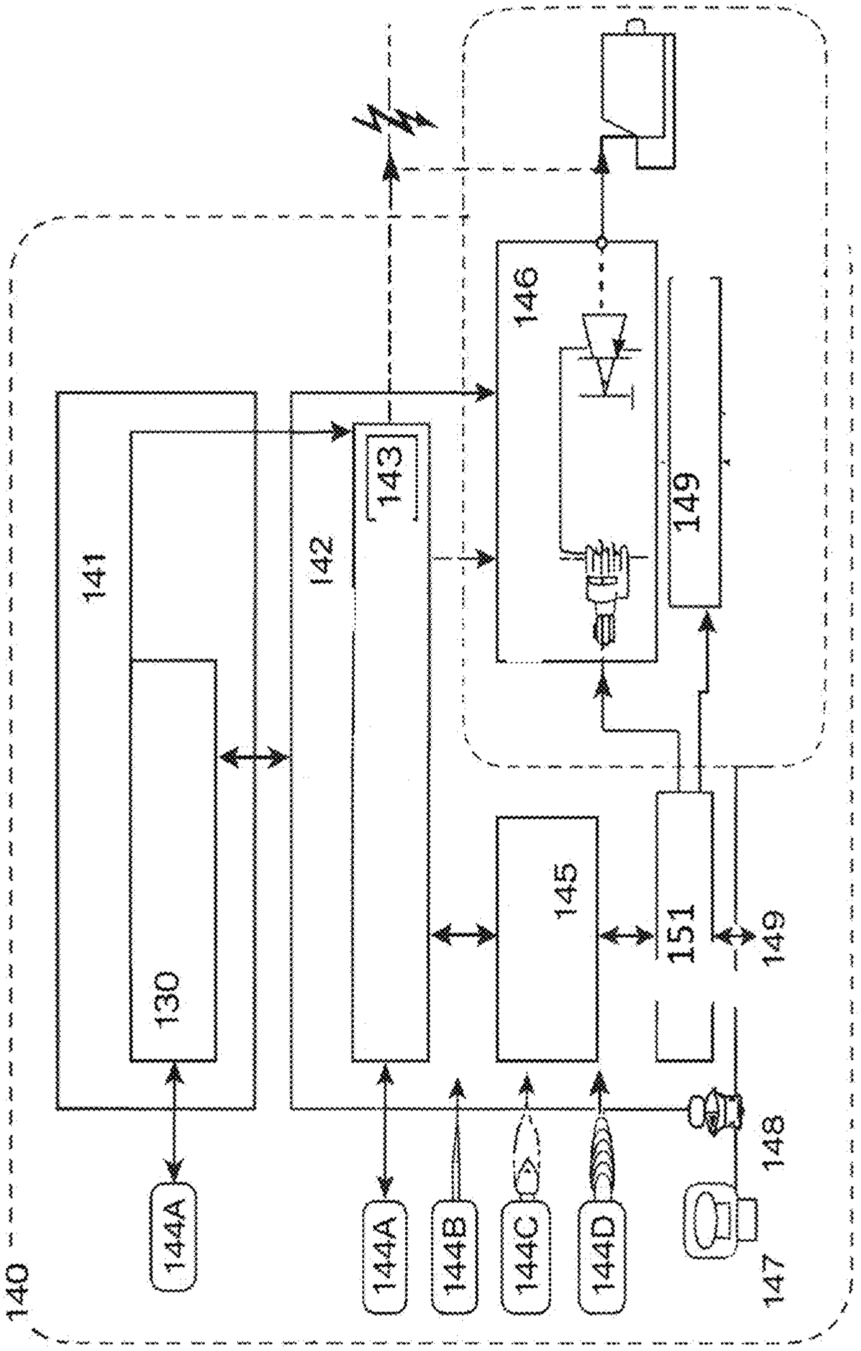
FIG. 5 illustrates safety enforcement subsystem architecture showing two-level safety implementation with software safety coordination and hardware safety enforcement including presence detection sensors, exclusion zone computation, and fail-safe interlock mechanisms.

FIG. 5—Safety Enforcement Subsystem Architecture

FIG. 5 illustrates comprehensive safety enforcement subsystem architecture showing two-level safety implementation with software safety coordination and hardware safety enforcement ensuring safety function continues during control processor failures or software malfunctions. The figure demonstrates architectural separation between software-level safety functions and hardware-level fail-safe enforcement providing defense-in-depth safety architecture suitable for deployment in human-occupied facilities.

Software safety level 141 operates within or associated with control processor 130 receiving presence sensor inputs and performing exclusion zone computations but does not directly control electromagnetic emission activation preventing software faults from compromising safety. Software safety level 141 provides user interface functions for zone visualization showing computed exclusion boundaries overlaid on facility layout, sensor status monitoring displaying operational state and health of all presence detection sensors, system coordination interfacing with building management systems and fire alarm panels, and configuration management storing zone parameters and sensor calibration data. Software level communicates computed exclusion zone boundaries and sensor status information to hardware safety level 142 but emission permission decisions are made independently by hardware safety level ensuring that software complexity, potential bugs, communication failures, or control processor malfunctions cannot enable unsafe emission activation. This architectural separation implements defense-in-depth safety principle where multiple independent protective layers prevent hazardous conditions.

Hardware safety level 142 comprises dedicated safety microcontroller 143 operating independently from primary control processor 130 with separate power supply, independent clock source, isolated communication channels, and dedicated firmware implementing safety decision logic 151. Safety microcontroller 143 receives direct connections from presence sensors through redundant signal paths electrically isolated from primary processor communication channels preventing common-mode failures where single fault could compromise both control and safety functions. Safety decision logic 151 implemented within safety microcontroller 143 evaluates inputs from presence sensors 144A-D, exclusion zone computation 145, emergency stop 147, key switch 148, and system health monitors, generating emission permission signal controlling hardware interlock 146. Multiple routing paths provide redundancy ensuring sensor signals reach safety microcontroller even if individual wire breaks or connector failures occur. Voting logic implemented in safety microcontroller firmware resolves conflicts between multiple sensor inputs using conservative decision rules where any sensor detecting presence triggers safety response preventing emission activation. Watchdog timer circuits monitor safety microcontroller operation resetting processor if firmware execution stalls or enters infinite loop ensuring continued safety function even during microcontroller malfunctions. Hardware implementation provides deterministic behavior with guaranteed worst-case response times typically in millisecond range enabling rapid safety response, and continued safety function during primary control processor failure conditions including processor crashes, power supply failures, or communication link interruptions.

Presence detection sensors provide redundant detection capability using multiple sensor modalities with different physical principles reducing false alarm probability while maintaining high detection reliability ensuring personnel safety. Passive infrared sensors 144A detect human thermal signatures through infrared emission in wavelength range of approximately 8 to 14 micrometers corresponding to human body temperature of approximately 37 degrees Celsius or 98.6 degrees Fahrenheit. Multiple passive infrared sensors are positioned throughout protected areas with overlapping fields of view eliminating blind spots where personnel might be present but undetected. Individual sensor field of view typically spans approximately 90 degrees horizontal by 60 degrees vertical providing cone-shaped detection zone. Detection range extends from close proximity to tens of meters depending on sensor sensitivity and environmental conditions. Passive infrared detection operates continuously without requiring active illumination drawing minimal power and providing reliable detection of stationary or moving personnel based on thermal contrast between human body temperature and ambient background temperature.

Ultrasonic ranging sensors 144B employ acoustic echo ranging measuring time-of-flight for reflected acoustic pulses determining distances to objects and people within sensor field of view. Ultrasonic sensors transmit brief acoustic pulse at frequency typically 40 kilohertz above human hearing range and measure elapsed time until reflected echo returns from objects. Distance calculated as half of time-of-flight multiplied by speed of sound in air approximately 343 meters per second at room temperature. Narrow acoustic beams scan protected volume through mechanical scanning mirror or electronic beam steering in phased array configurations. Operating range typically extends from 0.5 to 10 meters with range resolution of approximately 1 centimeter enabling precise position determination. Ultrasonic sensors detect both stationary and moving objects providing complementary capability to passive infrared sensors which rely on thermal contrast. Multiple ultrasonic sensors positioned strategically provide complete coverage of exclusion zones.

Computer vision cameras 144C capture visible light or thermal imagery processed by machine learning classifiers trained on human detection datasets recognizing human figures in various poses, clothing, and environmental conditions. Camera sensors employ silicon-based imaging arrays for visible light detection or microbolometer arrays for thermal imaging. Image processing algorithms including convolutional neural networks trained on labeled datasets containing thousands of human images enable robust detection across varying conditions including different lighting, partial occlusion, unusual poses, and diverse clothing. Multiple cameras positioned with overlapping fields of view provide stereo vision capability enabling three-dimensional position estimation through triangulation comparing apparent position of detected person in images from different camera viewpoints. Three-dimensional position information enables accurate exclusion zone boundary comparison determining whether detected person is inside or outside computed safe distance from emission source. Computer vision provides highest information content among sensor modalities enabling not only detection but also pose estimation, activity recognition, and personnel counting supporting advanced safety functions.

Microwave radar sensors 144D employ Doppler frequency shift detection sensing motion through direct measurement of radial velocity component of moving objects. Radar transmits continuous wave or pulsed microwave radiation typically at frequency of 10.525 gigahertz in X-band or 24.125 gigahertz in K-band and receives reflected signal from objects. Moving objects cause Doppler frequency shift in reflected signal proportional to radial velocity according to relationship where frequency shift equals two times transmitted frequency times velocity divided by speed of light. Signal processing extracts Doppler shift identifying moving objects and measuring velocities. Microwave radiation penetrates non-conductive barriers including walls, doors, partitions, and furnishings detecting personnel in adjacent spaces not directly visible to optical sensors providing unique capability for through-barrier detection. This penetration capability eliminates blind spots behind obstacles ensuring comprehensive presence detection throughout protected facility. Range typically extends to tens of meters with velocity sensitivity enabling detection of walking, running, or other human motion.

Sensor fusion combines multiple sensor modalities using logical AND/OR operations and probabilistic methods improving detection reliability while controlling false alarm rate. Conservative safety logic implements OR-gate behavior where any sensor detecting presence triggers safety response preventing emission activation ensuring that single sensor detecting person provides adequate protection even if other sensors fail to detect or experience faults. Alternative fusion strategies employ majority voting requiring multiple sensors to agree before triggering safety response reducing false alarms from individual sensor malfunctions or environmental disturbances while maintaining adequate safety margin. Probabilistic fusion methods employ Bayesian inference combining detection confidence estimates from multiple sensors computing posterior probability of human presence accounting for individual sensor reliability characteristics and environmental conditions. Fusion logic implemented in safety microcontroller firmware processes sensor inputs in real-time with update rates typically 10 to 100 hertz providing rapid response to changing presence conditions.

Exclusion zone computation 145 calculates three-dimensional electromagnetic field strength distribution in space surrounding directional emission structure based on operating parameters including radiated power, antenna gain, operating frequency, and beam pointing direction, then compares calculated field strength against applicable exposure guidelines establishing zone boundary surface where field strength equals exposure limit. Field strength calculation employs electromagnetic propagation models based on antenna theory and wave propagation physics. For directive antenna with known gain factor G, electric field strength E at distance r from source is calculated using relationship E equals square root of quantity 30 times radiated power P times antenna gain G end quantity divided by distance r, where factor 30 derives from impedance of free space and unit conversions, power P is measured in watts, gain G is numeric ratio (not decibels), distance r is measured in meters, and resulting field strength E is measured in volts per meter. This relationship accounts for geometric spreading loss where field strength decreases inversely with distance as electromagnetic energy spreads over increasing spherical surface area.

Antenna gain and radiation pattern data provide directional variation showing higher field strength along main beam axis where antenna focuses energy and reduced field strength in other directions. Radiation pattern typically represented as normalized gain versus angle in azimuth and elevation planes shows main lobe, sidelobes, and null regions. Three-dimensional field strength distribution computed by evaluating field strength equation at multiple spatial points accounting for antenna pattern directional variation. Atmospheric absorption coefficients modify field strength calculation for longer propagation distances with absorption increasing at higher frequencies particularly in millimeter wave bands where molecular resonances in oxygen and water vapor cause significant attenuation. Absorption represented as exponential decay factor applied to calculated field strength with attenuation coefficient dependent on frequency, humidity, temperature, and pressure.

Calculated field strength distribution is compared against applicable exposure guidelines determining safe and unsafe regions. Exposure guidelines include limits specified by Institute of Electrical and Electronics Engineers Standard C95.1 defining maximum permissible field strength at various frequencies based on research into biological effects of electromagnetic fields, limits from International Commission on Non-Ionizing Radiation Protection publishing guidelines used in Europe and other jurisdictions, regulatory requirements from Federal Communications Commission in United States or equivalent national regulatory bodies in other countries, and facility-specific policies that may impose more conservative limits than regulatory minimums. Exposure limits vary with frequency reflecting different biological interaction mechanisms and tissue penetration depths at different frequencies. Zone boundary represents three-dimensional surface where calculated field strength equals applicable exposure limit creating exclusion volume within which personnel exposure would exceed guidelines. Exclusion zone typically has ellipsoidal or cone-shaped geometry with major axis aligned with antenna main beam direction and dimensions determined by radiated power and antenna gain.

Dynamic zone updates recalculate boundary in real-time as operating parameters change during system operation. If emission power level increases due to adaptive modulation selecting higher power for improved suppression effectiveness, zone boundary expands outward requiring larger clearance distance before emission activation permitted. If beam steering redirects antenna main beam toward different azimuth or elevation angle, zone boundary shifts spatially following new beam direction potentially moving exclusion volume into previously safe regions requiring presence re-evaluation. If operating frequency changes in systems employing frequency-agile sources, different exposure limits apply and atmospheric absorption changes requiring complete zone recalculation. Zone computation performed by software safety level 141 with results transmitted to hardware safety level 142 containing safety decision logic 151 for emission permission decision. Update rate typically 1 to 10 hertz provides responsive tracking of parameter changes while limiting computational burden.

Safety decision logic 151 comprises firmware and hardware logic circuits implemented within safety microcontroller 143 receiving sensor inputs, zone boundaries, and manual control states, executing Boolean decision tree evaluation, and generating emission permission signal controlling hardware interlock 146. Safety decision logic 151 evaluates multiple inputs determining emission permission status controlling hardware interlock 146. Logic inputs include presence detection status from sensors 144A-D indicating whether any sensor detects human presence in protected areas, exclusion zone boundaries from zone computation 145 defining three-dimensional surface where field strength equals exposure limit, manual control states including emergency stop button 147 status indicating whether emergency stop pressed by personnel, key switch 148 position requiring authorized credential for system enablement, and system health status from self-test results checking sensor function and fault detectors monitoring power supplies and communication links. Safety decision logic 151 implements structured evaluation following decision tree: IF emergency stop button 147 pressed OR presence detected by sensors 144A-D within exclusion zone 145 OR system fault detected OR key switch 148 not enabled THEN emission permission signal set to FALSE prohibiting emission activation, ELSE IF all conditions satisfied with no emergency stop AND no presence detected in zone AND no faults detected AND key switch enabled THEN emission permission signal set to TRUE allowing emission when commanded by control processor. Boolean logic implemented in safety microcontroller 143 firmware evaluates conditions deterministically with guaranteed execution time ensuring rapid response.

Emission permission signal from safety decision logic 151 controls hardware interlock 146 physically interrupting power path to electromagnetic source. TRUE permission state indicating safe conditions energizes interlock enabling power flow. FALSE permission state indicating unsafe conditions de-energizes interlock physically interrupting power preventing electromagnetic emission. State transitions occur rapidly within milliseconds of condition changes providing responsive safety protection. Permission signal generated by dedicated output pin on safety microcontroller 143 with electrical drive capability sufficient for interlock control. Signal path includes fault detection monitoring wire continuity and load current verifying interlock responds correctly to commands.

Hardware interlock 146 implements fail-safe emission control through physical interruption of power supply to electromagnetic source ensuring emission cannot occur when safety conditions not satisfied. Two alternative interlock implementations provide different tradeoffs between cost, reliability, switching speed, and power handling capability. Electromechanical relay implementation employs electromagnetic relay with coil energized by emission permission signal from safety decision logic 151 controlling normally-open contacts positioned in series with emission source power line physically interrupting current flow when de-energized. When permission signal TRUE indicating safe conditions, relay coil receives energizing current typically 12 or 24 volts DC generating magnetic field that attracts armature closing normally-open contacts completing power circuit to emission source. When permission signal transitions to FALSE indicating unsafe conditions, coil current removed, magnetic field collapses, spring force opens contacts breaking power circuit, and emission source loses power preventing electromagnetic emission. Contact ratings selected based on switched current and voltage specifications handling peak and average power levels without contact degradation. Silver-cadmium-oxide or silver-tin-oxide contact materials provide reliable switching of high currents with minimal contact resistance and good arc suppression. Mechanical position indicator visible through relay housing shows contact state enabling visual verification of interlock status during testing and troubleshooting. Relay response time typically 5 to 20 milliseconds provides rapid safety response adequate for personnel protection.

Solid-state switch implementation employs semiconductor switching devices providing faster response and longer operating life compared to electromechanical relays. Implementation includes optically-isolated driver receiving permission signal from safety decision logic 151 providing electrical isolation between control and power circuits preventing fault propagation, power semiconductor switch such as MOSFET for DC switching or IGBT for AC switching with current and voltage ratings suitable for switched power levels and adequate safety margin, gate drive circuitry providing appropriate voltage and current waveforms for switch control with shoot-through protection and dead-time generation for complementary switch pairs, and status monitoring detecting switch failures including short-circuit faults and open-circuit faults reporting status to safety microcontroller 143. Solid-state switches provide switching times typically 1 microsecond to 1 millisecond much faster than electromechanical relays enabling rapid safety response. No mechanical wear occurs extending operating life to millions or billions of switching cycles compared to hundreds of thousands for relays. Heat dissipation in conducting state requires heat sink design maintaining junction temperature within safe limits. Gate drive requires continuous power for conduction unlike relay holding current presenting potential failure mode if gate drive power lost.

Both implementations provide fail-safe behavior where loss of permission signal, power failure to safety microcontroller, broken connections in control wiring, or component failures result in emission prohibition maintaining safe state. Fail-safe principle ensures that any single fault or unanticipated condition defaults to safe configuration with emission prevented. Periodic testing verifies interlock function with automated self-test sequences commanding interlock state changes and monitoring current flow confirming correct response. Test results logged for maintenance tracking and regulatory compliance documentation.

Manual controls provide direct personnel interface for safety system operation and emergency response. Emergency stop button 147 provides immediate emission shutdown through hardwired signal path to safety decision logic 151 independent of software or processors ensuring rapid response to emergency conditions. Emergency stop implemented as red mushroom-head latching button conforming to industrial safety standards with large easily identified actuator, latching mechanism requiring deliberate reset action preventing accidental re-enablement, and hardwired connection to safety microcontroller 143 with redundant contacts providing multiple signal paths. Multiple emergency stop buttons positioned at strategic locations throughout facility including near entry doors, at operator workstations, and in areas where personnel routinely work enable rapid access from any location. Emergency stop signal path bypasses all software processing connecting directly to safety microcontroller 143 feeding safety decision logic 151 triggering immediate interlock opening. Latching behavior maintains stopped state until operator deliberately resets by twisting or pulling button requiring conscious decision to restore operation preventing inadvertent restart.

Key switch 148 requires authorized credential for system enablement preventing unauthorized operation by untrained personnel. Key switch employs removable metal key with unique pattern matching single lock cylinder. Switch positions include OFF position preventing all emission operations regardless of other conditions and ON position enabling emission if other safety conditions satisfied. Key retained by authorized operators or facility safety personnel ensuring only trained qualified individuals can enable potentially hazardous electromagnetic emission. Key switch wiring connects to safety microcontroller 143 monitored input feeding safety decision logic 151 with switch position continuously evaluated in safety decision logic. Loss of key prevents unauthorized enablement providing administrative control over system operation.

Status indicators 149 provide visual and audible feedback of system state enabling operators and personnel to understand current operating mode and safety status. Indicator panel includes multiple light emitting diodes with color-coded meanings conforming to industrial conventions: standby green light indicating system powered and ready with all safety conditions satisfied but emission not commanded, armed yellow light indicating emission commanded by control processor pending final safety clearance, active red light indicating electromagnetic emission operating requiring personnel evacuation from exclusion zones, fault flashing red light indicating system malfunction detected requiring maintenance attention. Audible alarms provide attention-getting sounds supplementing visual indicators alerting personnel in areas where visual indicators not easily visible. Alarm tones differentiate between conditions with continuous tone for active emission, pulsing tone for armed state, and distinctive fault pattern. Audio volume adjustable for facility acoustic environment providing adequate audibility without excessive noise. Status indicators 149 positioned at strategic locations including entry doors, control stations, and prominent facility areas ensuring personnel awareness of system state with status signals driven by safety decision logic 151 and hardware interlock 146.

Fault detection monitors system health identifying malfunctions requiring maintenance intervention or safety shutdown. Watchdog timers monitor safety microcontroller 143 operation verifying continued firmware execution by requiring periodic timer reset commands generated by firmware main loop, if firmware stalls or enters infinite loop watchdog expires triggering microcontroller reset or interlock opening depending on failure severity. Sensor self-tests verify sensor function through periodic test sequences including commanded sensor activation, monitoring expected responses, comparing against nominal performance baselines, and identifying degraded or failed sensors. Built-in test sequences execute periodically during standby intervals exercising all system components, verifying communication links, testing interlock operation, and validating safety logic execution. Test failures generate fault indications displayed on status indicators 149 and logged in non-volatile memory for maintenance review. Logged fault history provides diagnostic information for troubleshooting and reliability analysis tracking failure modes and failure rates supporting predictive maintenance.

Integration interfaces connect safety enforcement subsystem to building systems enabling coordinated emergency response and facility management. Fire alarm system interface receives safety system status and fault indications providing centralized monitoring of fire protection equipment. Building management system interface reports system state enabling facility-wide coordination of HVAC shutdown, elevator recall, and access control during fire emergencies. Emergency notification system interface triggers automated alerts notifying building occupants, emergency responders, and facility management when fire detected or suppression activated. Access control system interface coordinates door locking preventing personnel entry into exclusion zones when emission active or armed. Integration employs standard protocols including BACnet for building automation, Modbus for industrial control, or proprietary interfaces specified by building system vendors. Communication redundancy through dual network paths ensures continued integration function during network failures. Cybersecurity measures including authentication, encryption, and access control protect integration interfaces from unauthorized access or malicious attacks.

Figure 6:
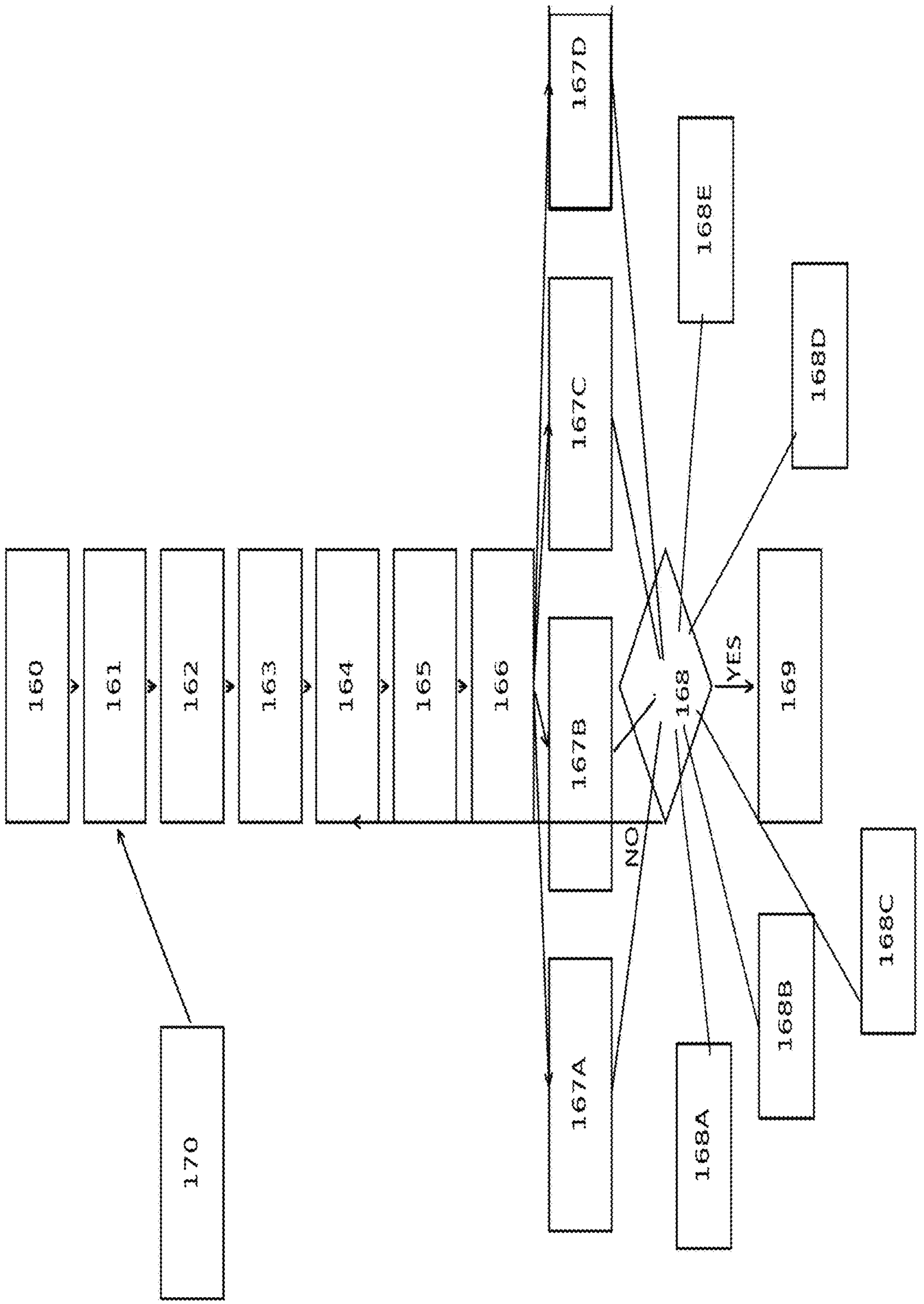
FIG. 6 is a flowchart of the adaptive modulation process showing parameter characterization, response measurement, optimization algorithm selection and execution, and convergence criteria evaluation.

FIG. 6—Adaptive Modulation Flowchart

FIG. 6 provides comprehensive flowchart illustrating adaptive modulation process executed by control processor 130 enabling real-time optimization of emission parameters based on measured combustion response without requiring predetermined parameter libraries. The flowchart demonstrates systematic exploration of parameter space, measurement of combustion response to varying parameters, computation of effectiveness metrics, selection and execution of optimization algorithms, and evaluation of convergence criteria determining when optimal parameters identified and sustained suppression commences. Process architecture enables accommodation of varying fuel types, flame geometries, atmospheric conditions, and combustion intensities through empirical optimization rather than relying on static predetermined parameter sets that may prove suboptimal or ineffective for actual conditions encountered in real deployment scenarios.

Flowchart begins with combustion detection event 160 triggered when detection subsystem 110 identifies combustion signatures through sensor fusion processing thermal imaging, ultraviolet spectroscopy, visible light imaging, or smoke detection sensor outputs indicating fire presence requiring suppression response. Detection event initiates adaptive modulation sequence proceeding to baseline measurement phase 161 capturing reference combustion characteristics with electromagnetic emission subsystem 120 inactive. Baseline measurements include temperature distribution from thermal imaging sensor 112 providing spatial temperature map across combustion zone with peak temperature identification and temperature gradient computation, ultraviolet emission intensity from UV detector 114 measuring characteristic OH and CH radical emission at wavelengths of 185-260 nanometers indicating combustion chemistry activity level, visible flame structure from camera 116 capturing flame boundary geometry and spatial extent through image processing algorithms, and smoke concentration from smoke detector 118 monitoring particulate levels and optical density. Baseline data establishes reference state characterizing unperturbed combustion providing comparison foundation for evaluating suppression effectiveness when electromagnetic emission applied. Multiple baseline measurements may be averaged over several seconds improving signal-to-noise ratio and reducing influence of transient fluctuations in flame characteristics.

Following baseline establishment, process proceeds to emission activation block 162 energizing electromagnetic emission subsystem 120 with initial parameter values selected through multiple possible strategies. Default parameter selection employs predetermined nominal values based on typical operating conditions providing consistent starting point for optimization. Historical parameter selection retrieves previously successful parameter combinations for similar combustion events identified through event classification based on fuel type, flame size, or location providing informed starting point likely near optimal values reducing optimization iterations required. Random initialization selects parameters from allowable ranges using uniform or weighted random distributions enabling exploration of diverse starting points potentially discovering unexpected effective parameter regions. Systematic exploration starting point positions parameters at specific locations in parameter space such as corner points or center point of allowable parameter ranges supporting structured search strategies. Initial parameters specified include pulse repetition frequency f-subscript-0 determining temporal pattern of energy delivery measured in hertz with typical range 10 to 10000 Hz, pulse duration tau-subscript-0 controlling energy per pulse measured in microseconds or milliseconds with typical range 1 microsecond to 100 milliseconds, duty cycle DC-subscript-0 determining average power as fraction of peak power expressed as percentage with typical range 1 to 100 percent, and instantaneous power level P-subscript-0 setting electromagnetic field strength magnitude measured in watts or kilowatts with level selected based on source capability and application requirements.

During electromagnetic emission operation, response measurement block 163 continuously monitors combustion state capturing response to electromagnetic exposure with sensor sampling synchronized to emission pulse timing enabling correlation between parameters and observed effects. Thermal imaging captures temperature evolution tracking spatial and temporal temperature changes under electromagnetic forcing with frame rates typically 10 to 100 frames per second providing detailed time-resolved temperature dynamics. Ultraviolet detection measures emission intensity variations indicating changes in radical concentrations and ionization levels with sampling rates typically 100 to 10000 samples per second capturing rapid transient responses. Visible imaging records flame boundary displacement and structure modification through high-speed video capture at frame rates 30 to 1000 frames per second enabling analysis of flame motion and shape changes. Smoke detection monitors combustion product generation rates tracking particulate emission levels indicating completeness of combustion or suppression effectiveness. Measurement timing synchronization aligns sensor data acquisition with emission pulse edges enabling discrimination of pulse-on versus pulse-off response identifying direct electromagnetic effects versus thermal relaxation or diffusion processes occurring between pulses. Data timestamping with microsecond or millisecond resolution enables precise temporal correlation supporting detailed response analysis.

Parameter variation block 164 systematically adjusts emission parameters exploring parameter space to identify effective combinations providing desired suppression performance. Multiple exploration strategies provide different tradeoffs between search efficiency, parameter space coverage, and computational complexity. One-dimensional sweep strategy varies single parameter while holding others constant stepping through discrete values spanning allowable range then repeating for next parameter until all parameters explored. One-dimensional approach provides simple implementation with straightforward data interpretation but requires many measurements scaling linearly with number of parameters and number of test points per parameter, and may miss multi-parameter interactions where optimal combinations require simultaneous adjustment of multiple parameters. Multi-dimensional grid scan strategy varies multiple parameters simultaneously on regular grid pattern with test points positioned at intersections of parameter value arrays. Grid scan provides comprehensive parameter space coverage enabling identification of multi-parameter interactions and global optima but suffers from curse of dimensionality where required measurements increase exponentially as M to the power N where M is points per dimension and N is number of parameters, making exhaustive grid search impractical for more than 3-4 parameters. Adaptive sampling strategy concentrates measurements in promising parameter regions identified through observed responses allocating measurement resources where most valuable while avoiding exhaustive coverage of poorly performing regions. Adaptive methods include gradient-following moving in direction of performance improvement, simplex methods maintaining geometric pattern of test points adapting position and size based on local function topology, and Bayesian optimization building probabilistic surrogate model guiding selection of next evaluation point. Adaptive strategies provide measurement efficiency requiring fewer evaluations to locate good parameter combinations but demand sophisticated sampling algorithms and may become trapped in local optima without global search capability.

Response metric computation block 165 converts raw sensor measurements into scalar or vector performance indicators quantifying suppression effectiveness and enabling systematic comparison between parameter combinations. Maximum temperature reduction delta-T-subscript-max computes difference between baseline peak temperature and minimum peak temperature observed during emission measuring instantaneous cooling magnitude achieved indicating suppression intensity with typical metric values ranging from 0 degrees Celsius indicating no suppression to hundreds of degrees Celsius for effective suppression. Temperature reduction integral computes spatial integral of temperature reduction across entire monitored area or volume quantifying total thermal energy removed or combustion intensity reduced accounting for both magnitude and spatial extent of cooling effect with metric expressed in degree-meters-squared or degree-meters-cubed providing comprehensive measure of suppression effectiveness. Flame displacement magnitude calculates physical flame movement under electromagnetic forcing measuring distance between baseline flame centroid position and displaced flame position indicating momentum transfer effectiveness and gas flow modification with displacement measured in centimeters or meters. Ultraviolet emission reduction ratio computes ratio of suppressed UV emission intensity to baseline UV emission intensity indicating reduction in radical concentrations and combustion chemistry activity level with ratio values ranging from 1.0 indicating no suppression to approaching 0.0 for complete combustion interruption. Multi-objective composite metric combines multiple individual metrics through weighted summation or multiplicative combination balancing different performance goals such as temperature reduction, spatial coverage, response speed, and energy efficiency with weighting coefficients selected based on application priorities. Effectiveness database maintains association between tested parameter combinations and resulting metric values building empirical model of system behavior mapping parameter space to performance space supporting optimization algorithm execution.

Optimization algorithm selection block 166 determines method for identifying optimal parameters from accumulated effectiveness measurements choosing algorithm based on parameter space characteristics, available computational resources, optimization time constraints, and desired optimality guarantees. Decision factors include parameter dimensionality with low-dimensional spaces of 1-3 parameters enabling simple methods while high-dimensional spaces of 5 or more parameters requiring sophisticated algorithms, effectiveness function topology with smooth unimodal functions enabling gradient methods while rugged multi-modal functions requiring global search, measurement noise level with low noise enabling deterministic algorithms while high noise requiring robust methods averaging multiple evaluations, available computation time with rapid response requirements favoring simple fast algorithms while relaxed time constraints enabling complex methods, and convergence requirements balancing local optimization finding nearby optimum quickly versus global optimization identifying best solution across entire parameter space potentially requiring more computation.

Gradient descent algorithm 167A computes partial derivatives of effectiveness function with respect to each parameter through finite difference approximation evaluating effectiveness at slightly perturbed parameter values and calculating slope from effectiveness change divided by parameter perturbation. Gradient vector assembled from partial derivatives indicates direction of steepest performance improvement in parameter space. Algorithm steps iteratively from current parameter position in gradient direction with step size controlling convergence rate and stability where large steps enable rapid progress but risk overshooting optimum while small steps provide stability but slow convergence. Parameter update follows form: next parameter vector equals current parameter vector plus step size times gradient vector where step size may be constant or adaptively adjusted based on observed convergence behavior. Gradient descent provides rapid local convergence when effectiveness function smooth and unimodal achieving logarithmic or superlinear convergence rates reaching optimum within 5-20 iterations typically. Algorithm may become trapped in local optima for multi-modal functions terminating at suboptimal solution and performs poorly when effectiveness function has discontinuities, noise, or flat regions where gradient vanishes. Computational cost scales as order of parameters squared per iteration due to finite difference gradient computation requiring 2N function evaluations where N is parameter count.

Genetic algorithm 167B maintains population of candidate parameter sets representing diverse potential solutions distributed across parameter space. Population size typically 20 to 200 individuals balances exploration capability against computational cost. Each population member evaluated for effectiveness producing fitness score used for selection. Selection operator identifies high-performing members for reproduction with selection probability proportional to fitness ensuring fitter individuals more likely to propagate genes to next generation while maintaining population diversity preventing premature convergence. Crossover operator generates offspring parameter sets by combining parent parameters simulating genetic recombination with crossover point randomly selected determining which parent contributes each parameter to offspring or using arithmetic averaging blending parent values. Mutation operator introduces random variations in parameter values with small probability typically 1 to 10 percent maintaining population diversity and enabling exploration of new parameter space regions preventing convergence to local optima. Population evolves over multiple generations typically 10 to 100 generations with average fitness generally improving as effective parameter combinations discovered and propagated while ineffective combinations eliminated. Genetic algorithms provide global search capability exploring diverse parameter space regions avoiding local optima through population diversity and suitable for complex multi-modal effectiveness landscapes including discontinuities and noise. Computational cost substantial requiring population size times generation count function evaluations typically 1000 to 10000 total evaluations making approach suitable when optimization quality more important than computation time.

Simulated annealing algorithm 167C employs probabilistic acceptance of parameter changes inspired by metallurgical annealing process where controlled cooling enables material to reach low-energy crystalline structure avoiding metastable amorphous states. Algorithm accepts parameter changes improving effectiveness with certainty ensuring hill-climbing progress toward better solutions while accepting degrading changes with probability depending on degradation magnitude and temperature parameter enabling occasional uphill moves escaping local optima. Acceptance probability for changes degrading effectiveness by amount delta-E at temperature T follows exponential relationship: probability equals exp of minus delta-E divided by T where larger temperature increases acceptance probability enabling aggressive exploration while lower temperature restricts acceptance focusing search near current best solution. Temperature parameter starts high early in optimization allowing exploration of distant parameter space regions with frequent acceptance of uphill moves sampling diverse solutions. Temperature gradually reduces according to cooling schedule controlling rate of temperature decrease with typical schedules including geometric cooling multiplying temperature by factor 0.8 to 0.99 each iteration, logarithmic cooling reducing temperature proportional to 1 divided by log of iteration count, or adaptive cooling adjusting rate based on observed acceptance rates. Low temperature late in optimization restricts acceptance primarily to improving moves refining parameter values converging toward local optimum. Simulated annealing avoids local optima through probabilistic uphill moves during high-temperature exploration phase while achieving convergence to good solutions as temperature reduces focusing search, and suitable for rugged effectiveness landscapes with multiple local optima. Computational cost moderate requiring hundreds to thousands of function evaluations with performance depending critically on cooling schedule selection.

Bayesian optimization algorithm 167D builds probabilistic surrogate model of effectiveness function from limited observations enabling efficient exploration of expensive-to-evaluate parameter spaces. Gaussian process prior defines probability distribution over possible effectiveness functions with mean function mu representing expected effectiveness at each parameter combination and covariance kernel k encoding smoothness assumptions about how effectiveness varies across parameter space. Each parameter evaluation updates posterior distribution through Bayesian inference concentrating probability mass near measured values and propagating information to nearby parameter regions through kernel covariance. Acquisition function determines next parameter evaluation location by balancing exploitation of high-performing regions indicated by high posterior mean against exploration of uncertain regions with high posterior variance where potential for discovering better solutions exists. Expected improvement acquisition function integrates probability of exceeding current best performance weighted by magnitude of improvement providing principled exploration-exploitation tradeoff. Upper confidence bound acquisition selects parameters maximizing weighted sum of posterior mean plus posterior standard deviation with weighting coefficient controlling exploration aggressiveness. Bayesian optimization provides sample efficiency requiring significantly fewer function evaluations than grid search or random sampling making approach suitable when each effectiveness evaluation computationally expensive or time-consuming requiring seconds to minutes per evaluation. Typical performance achieves good solutions within 20 to 100 evaluations compared to thousands required by exhaustive methods. Computational cost concentrated in Gaussian process training and acquisition optimization requiring matrix operations scaling as cube of number of observations but offset by dramatic reduction in required function evaluations.

Convergence criteria evaluation block 168 determines when optimization completes and sustained suppression commences by evaluating multiple stopping conditions indicating adequate parameter identification. Effectiveness threshold achievement criterion 168A triggers completion when measured effectiveness exceeds target level indicating desired suppression degree has been reached making further optimization unnecessary. Threshold value specified based on application requirements such as temperature reduction exceeding 200 degrees Celsius or UV emission reduction exceeding 80 percent. Parameter change magnitude criterion 168B monitors parameter changes between successive optimization iterations calculating Euclidean distance between parameter vectors or maximum coordinate-wise change terminating when changes fall below tolerance threshold suggesting convergence to optimum where further iterations produce negligible parameter adjustment. Typical tolerance values 0.1 to 1 percent of parameter range. Effectiveness plateau criterion 168C detects when successive evaluations yield similar effectiveness values within small tolerance indicating diminishing returns from further optimization. Plateau detected when effectiveness change over last 3 to 10 iterations falls below threshold typically 1 to 5 percent of effectiveness range. Iteration limit criterion 168D enforces maximum iteration count preventing indefinite optimization in difficult cases where convergence slow or effectiveness landscape pathological. Iteration limit typically 20 to 100 iterations selected balancing optimization quality against time constraints. Time constraint criterion 168E terminates optimization after specified elapsed time ensuring suppression response initiated within required timeframe even if optimal parameters not yet identified. Time limit typically several seconds to tens of seconds based on suppression urgency and fire growth rate. Multiple criteria may be combined using logical OR operation where any criterion satisfaction triggers completion providing multiple paths to termination.

When convergence criteria satisfied, process proceeds to sustained operation block 169 maintaining electromagnetic emission at identified optimal parameters while continuing combustion monitoring enabling detection of changing conditions. Emission subsystem 120 operates with fixed parameters selected through optimization providing consistent suppression forcing. Response monitoring continues tracking combustion state evolution detecting temperature trends, flame size changes, and suppression effectiveness variation. If combustion conditions change substantially causing effectiveness degradation beyond acceptable threshold, process returns to parameter variation block 164 re-initiating adaptive optimization adapting parameters to new conditions ensuring continued suppression effectiveness despite changing fuel characteristics, atmospheric variations, or flame geometry evolution. Adaptation cycle repeats as needed throughout suppression operation maintaining effectiveness across dynamic conditions. Alternative manual override path 170 enables operator to bypass automatic optimization directly commanding specific parameter values based on expert knowledge or special circumstances providing operational flexibility for unusual situations or testing scenarios. Manual control remains available during sustained operation enabling real-time parameter adjustment if automatic optimization proves inadequate.

Computational requirements analysis indicates real-time constraints require optimization completion within seconds to tens of seconds preventing excessive delay before sustained suppression commences. Time budget allocation distributes available computation time across optimization algorithm iterations with faster algorithms enabling more iterations within fixed time while complex algorithms require fewer total iterations but longer per-iteration computation. Computational complexity scales with problem dimensionality where N-dimensional parameter space requires function evaluations and gradient computations growing as polynomial or exponential functions of N depending on algorithm selection. Effectiveness evaluation cost determines how many parameter combinations can be tested within time budget with simple metrics computable in milliseconds enabling hundreds of evaluations while complex metrics requiring sensor data processing may limit to tens of evaluations. Hardware computational capability affects achievable optimization complexity with modern processors supporting sophisticated algorithms in real-time while limited embedded systems may restrict to simple methods. Tradeoff optimization balances solution quality achievable through comprehensive search against response speed required for effective fire suppression accepting good-enough solutions rapidly rather than pursuing optimal solutions slowly.

What is claimed is:

1. A multi-modal combustion interruption system comprises:

- a detection subsystem comprising at least one sensor selected from the group consisting of thermal imaging sensors, ultraviolet detectors, visible light imaging sensors, and smoke detectors, wherein the detection subsystem is configured to identify a combustion event and generate combustion state data representative of a physical and thermal state of the combustion event;
- an electromagnetic emission subsystem comprising a pulsed energy source and a directional emission structure, wherein the electromagnetic emission subsystem is configured to direct pulsed electromagnetic emission toward the combustion event;
- a control processor configured to implement adaptive modulation comprising:
  - varying at least two emission parameters selected from pulse repetition frequency, pulse duration, duty cycle, and power level;
  - measuring combustion response after each variation;
  - computing an effectiveness metric based on measured combustion response; and
  - selecting emission parameters based on computed effectiveness metric; and
- a safety enforcement subsystem comprising:
  - hardware-level circuitry configured to operate independently of the control processor; and
  - presence detection employing multiple sensor modalities configured to prevent emission activation when presence is detected within an emission exclusion zone.

2. The multi-modal combustion interruption system of claim 1, further comprising at least one enhancement subsystem selected from the group consisting of:

- an ionization enhancement subsystem comprising at least one electrode and a discharge power supply configured to generate ionized species in a region proximate to the combustion event;
- a particle generation subsystem comprising at least one of an atomizer, a nozzle, and a pressurized fluid delivery mechanism configured to introduce particles into a target zone; and
- an acoustic energy subsystem comprising at least one transducer and a driver circuit configured to apply directed acoustic energy to the combustion event.

3. The multi-modal combustion interruption system of claim 2, wherein the ionization enhancement subsystem employs at least one ionization technique selected from the group consisting of corona discharge, dielectric barrier discharge, and radiofrequency discharge.

4. The multi-modal combustion interruption system of claim 2, wherein the particle generation subsystem is configured to introduce particles comprising liquid droplets, solid particles, or combinations thereof.

5. The multi-modal combustion interruption system of claim 2, wherein the at least one enhancement subsystem comprises the ionization enhancement subsystem and the particle generation subsystem.

6. The multi-modal combustion interruption system of claim 5, wherein the at least one enhancement subsystem further comprises the acoustic energy subsystem.

7. The multi-modal combustion interruption system of claim 6, configured for extended standoff distance applications.

8. The multi-modal combustion interruption system of claim 1, wherein: the pulsed energy source operates at frequencies allocated for Industrial, Scientific, and Medical use; and the directional emission structure comprises at least one structure selected from the group consisting of a horn antenna, parabolic reflector, lens antenna, phased array, and electromagnetic metasurface.

9. A method for combustion interruption using a multi-modal combustion interruption system comprising:

- a detection subsystem comprising at least one sensor selected from the group consisting of thermal imaging sensors, ultraviolet detectors, visible light imaging sensors, and smoke detectors, wherein the detection subsystem is configured to identify a combustion event and generate combustion state data representative of a physical and thermal state of the combustion event;
- an electromagnetic emission subsystem comprising a pulsed energy source and a directional emission structure, wherein the electromagnetic emission subsystem is configured to direct pulsed electromagnetic emission toward the combustion event;
- a control processor configured to implement adaptive modulation comprising:
  - varying at least two emission parameters selected from pulse repetition frequency, pulse duration, duty cycle, and power level;
  - measuring combustion response after each variation;
  - computing an effectiveness metric based on measured combustion response; and
  - selecting emission parameters based on computed effectiveness metric; and
- a safety enforcement subsystem comprising:
  - hardware-level circuitry configured to operate independently of the control processor; and
  - presence detection employing multiple sensor modalities configured to prevent emission activation when presence is detected within an emission exclusion zone, the method comprises:

detecting the combustion event;

directing pulsed electromagnetic radiation toward the combustion event;

measuring the measured combustion response to varying emission parameters; and selected emission parameters based on the measured combustion response.

10. The method of claim 9, further comprising at least one enhancement step selected from the group consisting of:

generating charge carriers prior to directing electromagnetic radiation;

introducing particles into a target zone; and generating acoustic waves.

11. The method of claim 10, wherein the at least one enhancement step comprises generating charge carriers, introducing particles, and generating acoustic waves.

12. The multi-modal combustion interruption system of claim 1, wherein the directional emission structure comprises a phased array configured for electronic beam steering.

13. The multi-modal combustion interruption system of claim 1, wherein the system is configurable for deployment as a fixed installation utilizing grid power or as a vehicle-mounted platform with onboard power.

14. The multi-modal combustion interruption system of claim 4, wherein the particle generation subsystem is configured to be selectively enabled or omitted based on environmental compatibility requirements.

15. The multi-modal combustion interruption system of claim 1, wherein the detection subsystem employs at least two sensor modalities selected from the group consisting of thermal imaging, ultraviolet detection, visible light imaging, and smoke detection.

16. The multi-modal combustion interruption system of claim 1, wherein the safety enforcement subsystem is configured to:

compute an exclusion zone based on emission parameters; and prevent emission activation when presence is detected within the exclusion zone.

17. The multi-modal combustion interruption system of claim 1, configured for deployment in at least one application selected from the group consisting of industrial facilities, data centers, battery manufacturing, electrical substations, wildfire intervention, and emergency response.

18. The multi-modal combustion interruption system of claim 1, wherein the system is configurable to operate with the electromagnetic emission subsystem alone or in combination with at least one enhancement subsystem selected from ionization enhancement, particle generation, and acoustic energy subsystems.

19. The multi-modal combustion interruption system of claim 3, wherein the ionization enhancement subsystem comprises multiple electrodes distributed in array configuration.

20. The multi-modal combustion interruption system of claim 2, wherein the control processor is configured to selectively enable or disable each enhancement subsystem based on application requirements.

21. The system of claim 1, wherein the hardware-level circuitry comprises an electromechanical relay or solid-state switch positioned in series with electromagnetic emission power supply, configured to physically interrupt power delivery to the pulsed energy source independent of control processor operation.

22. The multi-modal combustion interruption system of claim 1, wherein measuring combustion response comprises detecting at least one combustion-specific parameter selected from the group consisting of: flame radical emission in ultraviolet spectrum, thermal gradient distribution within combustion zone, and flame boundary displacement under electromagnetic forcing.

* * * * *